United States Patent [19]

Takeuchi et al.

[11] Patent Number: 5,580,683
[45] Date of Patent: Dec. 3, 1996

[54] HIGH PULSE POWER CELL

[75] Inventors: Esther S. Takeuchi, East Amherst; Karen M. Walsh, Marilla, both of N.Y.

[73] Assignee: Wilson Greatbatch Ltd., Clarence, N.Y.

[21] Appl. No.: 340,669

[22] Filed: Nov. 16, 1994

Related U.S. Application Data

[63] Continuation-in-part of Ser. No. 146,707, Nov. 1, 1993, Pat. No. 5,435,874, and Ser. No. 169,002, Dec. 20, 1993, abandoned.

[51] Int. Cl.$^6$ .............. H01M 6/14; H01M 4/54; H01M 4/66
[52] U.S. Cl. .......... 429/194; 429/197; 429/217; 429/199; 429/219; 429/233; 429/245; 429/209; 29/623.1; 29/623.3
[58] Field of Search .................. 429/194, 197, 429/217, 199, 245, 209, 219, 233, 235, 241, 242; 29/623.1, 623.3, 623.5; H01M 6/14, 4/54, 4/66

[56] References Cited

U.S. PATENT DOCUMENTS

| | | | |
|---|---|---|---|
| 4,830,939 | 5/1989 | Lee et al. | 429/192 |
| 4,830,940 | 5/1989 | Keister et al. | 429/194 |
| 4,925,751 | 5/1990 | Shackle et al. | 429/191 |
| 4,956,247 | 9/1990 | Miyazaki et al. | 429/194 |
| 4,980,250 | 12/1990 | Takahashi et al. | 429/194 |
| 5,114,811 | 5/1992 | Ebel et al. | 429/194 |
| 5,154,992 | 10/1992 | Berberick et al. | 429/197 |
| 5,180,642 | 1/1993 | Weiss et al. | 429/90 |
| 5,244,757 | 9/1993 | Takami et al. | 429/194 |

*Primary Examiner*—Kathryn Gorgos
*Attorney, Agent, or Firm*—Hodgson, Russ, Andrews, Woods & Goodyear LLP

[57] ABSTRACT

A high pulse power electrochemical cell comprising an alkali metal-aluminum alloy anode, a nickel anode current collector, a calendared mixed metal oxide cathode active material pressed onto a cathode current collector comprising aluminum and a nonaqueous electrolytic solution, is described. The electrolytic solution preferably comprises at least one ion-forming alkali metal salt of hexafluorophosphate with the alkali metal salt being similar to the alkali metal comprising the anode. Lithium is the preferred alkali metal. This cell system produces high current pulses and can be housed in a casing having a reduced volume with respect to conventional electrochemical systems. Additionally, the anode/electrolytic solution exhibits reduced voltage delay without comprising heat dissipation.

42 Claims, 29 Drawing Sheets

HIGH PULSE POWER CELL

CROSS-REFERENCES

The present application is a continuation-in-part application of application Ser. No. 08/146,707 filed Nov. 1, 1993, entitled "Process For Making Cathode Components For Use In Electrochemical Cells," now U.S. Pat. No. 5,435,874 and application Ser. No. 08/169,002 filed Dec. 20, 1993, entitled "Electrolyte For Improved Performance And Stability", now abandoned.

BACKGROUND OF THE INVENTION

1. Field of the Invention

The present invention relates generally to electrochemical cells. More particularly, the present invention relates to a nonaqueous high pulse electrochemical cell having an anode comprising an alkali metal and a solid cathode. Preferably, the electrochemical cell of the present invention includes an alkali metal alloy anode such as lithium-aluminum anode active material, an anode current collector comprising nickel and a cathode comprising a calendared mixed metal oxide applied to a highly conductive metal screen. A preferred cathode material is silver vanadium oxide ($Ag_2V_4O_{11}$) pressed onto a cathode current collector comprising aluminum. This electrochemical system is preferably activated with an electrolytic solution comprising an alkali-metal salt of hexafluorophosphate and more preferably lithium hexafluorophosphate dissolved in a mixture of organic solvents when the anode comprises lithium.

2. Prior Art

The prior art has described various nonaqueous alkali metal/solid cathode electrochemical cells. While many of the prior art cells describe one or more of the components of the present high pulse power cell, none of them describes the combination of an alkali metal anode, an anode current collector comprising nickel, a calendared mixed metal oxide cathode active material such as silver vanadium oxide applied to a cathode current collector comprising aluminum and an electrolytic solution comprising an ion-forming alkali metal of hexafluorophosphate wherein the ion-forming alkali metal is similar to that comprising the anode. It is this cooperative electrochemical system that results in a synergistic improvement in the discharge efficiency of the high pulse power cell of the present invention, which magnitude of discharge efficiency is not provided by any of the prior art cells.

Among the prior art cells describing various components of the present high pulse power cell, there is U.S. Pat. No. 4,830,940 to Keister et al., which is assigned to the assignee of the present invention. Keister et al. describes a nonaqueous lithium electrochemical cell having a mixed metal oxide cathode associated with a cathode conductor formed from a thin sheet of metal screen, for example titanium or stainless steel screen. The cathode can comprise silver vanadium oxide as the active material combined with a binder such as polytetrafluoroethylene, and additionally may include conductive additives such as graphite powder and acetylene black. The cathode assembly is formed by pressing the cathode active material onto the titanium or stainless steel screen and enclosing the assembly in an envelope of separator material such as polypropylene. The anode comprises an alkali metal, preferably lithium or a lithium alloy enclosed within the separator and suitable electrolytes for activating the cell include a lithium salt dissolved in an organic solvent, preferably 1M lithium hexafluoroarsenate ($LiAsF_6$) dissolved in a 50:50 by volume mixture of propylene carbonate and dimethoxyethane (PC:DME).

The electrochemical cell of the present invention comprises a calendared cathode active material pressed onto an aluminum cathode current collector. This combination results in improved cell performance.

U.S. Pat. No. 5,154,992 to Berberick et al. describes a nonaqueous lithium/manganese dioxide electrochemical cell. Other suitable cathode materials include silver vanadium oxide mixed with carbon and polytetrafluoroethylene that has been pressed to form a porous solid structure. The separator is microporous polypropylene bonded to a nonwoven polypropylene substrate and the nonaqueous electrolyte includes salts such as $LiPF_6$ and $LiAsF_6$. This patent does not describe calendaring of the cathode active material mixed with the binder and conductive additives and pressed onto an aluminum current collector to form the cathode component.

U.S. Pat. No. 5,114,811 to Ebel et al., which is assigned to the assignee of the present invention, describes an electrochemical cell having a lithium-aluminum alloy anode and a solid cathode. The cathode comprises silver vanadium oxide associated with a current collector that can comprise titanium and stainless steel. Again, this patent does not describe the cathode as being formed in a calendaring step and aluminum is not included as one of the materials that are useful for the cathode current collector.

U.S. Pat. No. 5,244,757 to Takami et al. describes a lithium secondary electrochemical cell having a carbonaceous negative electrode and a positive electrode comprising a lithium/metal oxide or lithium/mixed metal oxide material, an organic binder material and a conductive additive. Examples of suitable materials for the positive electrode include such compounds as manganese dioxide, a lithium-manganese composite oxide, a lithium-nickel oxide, a lithium-manganese-cobalt oxide, a lithium containing noncrystalline vanadium pentoxide, or chalcogen compounds such as titanium disulfate or molybdenum disulfate. Also, a part of Co in the lithium-cobalt oxide may be substituted with the metals such as transition metals, Sn, Al, Mg, T, V. The positive electrode is formed by combining these ingredients, kneading the mixture into a sheet and pressing the sheet against a current collector made of a material such as aluminum. This electrochemical system is activated with a lithium ion conductive solution that can include $LiBF_4$, $LiPF_6$ or $LiCF_3SO_3$. However, silver vanadium oxide is not disclosed as a suitable mixed metal oxide, and in that respect, Takami et al. does not disclose the combination of an alkali metal anode, a cathode comprising a calendared silver vanadium oxide associated with an aluminum current collector and an activating electrolytic solution comprising lithium hexafluorophosphate provided as a primary electrochemical cell.

U.S. Pat. No. 4,980,250 to Takahishi et al. describes a secondary battery comprising a rechargeable positive electrode, a rechargeable lithium-containing negative electrode, a separator and an organic electrolytic solution. The positive electrode can comprise vanadium oxides combined with a conductive material such as graphite or acetylene black powder, and a binding agent such as polytetrafluoroethylene powder pressed into a film-like molded article. Suitable current collectors for both the anode and the cathode comprise metals such as nickel, titanium or stainless steel and the electrolyte is described as including $LiAsF_6$ dissolved in a non-porotic, high-dielectric organic solvent.

U.S. Pat. No. 4,925,751 to Shackle et al. describes a secondary lithium cell having a cathode composition that preferably includes $V_6O_{13}$ and electrically conductive carbon particles. This cell is activated with an ionically-conductive electrolyte comprising a single-phase solid solution of an ionizable alkaline metal salt, a solvent for the salt and a polymer which has been polymerized by exposure to actinic radiation, heat or which has been chemically polymerized. Although aluminum is listed along with stainless steel as suitable materials for the cathode current collector, the preferred current collector is described as a nickel foil having particles of nickel electrochemically deposited on the surface of the foil contacting the cathode composition. Further, the cathode active material is not calendared.

The high energy density electrochemical cell of the present invention is an improvement over the prior art alkali metal/mixed metal oxide cells, specifically lithium/silver vanadium oxide cells. In terms of current carrying capacity, energy density and ease of construction, among other advantages, the combination of an alkali metal-aluminum alloy anode associated with a nickel current collector, a calendared mixed metal oxide cathode active material pressed onto a cathode current collector comprising aluminum and a nonaqueous electrolytic solution comprising at least one ion-forming alkali metal salt of hexafluorophosphate, exhibits an electrochemically cooperative action that results in a synergistic improvement in cell discharge efficiency in comparison to the prior art cells. In particular, the electrochemical cell of the present invention discharges efficiently under pulse currents 1.6 times higher than those described by the prior art. In other words, the electrochemical cell of the present invention can be housed in a casing having a volume 40% to 50% smaller than the prior art cell systems while still being capable of discharging under equivalent current amplitudes. Additionally, the present alkali metal anode and electrolytic solution couple provides improvements in the voltage delay and discharge characteristics of the present high pulse power cell.

These and other improvements and advantages of the present invention will become increasingly more apparent to those skilled in the art by reference to the following descriptions and to the drawings.

SUMMARY OF THE INVENTION

The electrochemical cell of the present invention preferably includes a lithium metal anode and a solid cathode. The solid cathode is preferably formed from an admixture comprising a cathode active material selected from a metal element, a metal oxide, a metal sulfide and a mixed metal oxide, and combinations thereof combined with conductive additives and a binder material. These ingredients are thoroughly mixed together and calendared to form a flexible sheet of the cathode active material. The flexible cathode sheet is then cut to size and pressed onto a highly conductive metal screen, preferably comprising aluminum. A preferred cathode material is silver vanadium oxide ($Ag_2V_4O_{11}$). Both the cathode and anode are preferably encapsulated in a polypropylene separator and wound together in a flattened jellyroll configuration and housed in a prismatic case. With lithium comprising the anode, the cell is preferably activated by an electrolytic solution comprising 1M $LiPF_6$ dissolved in a 50:50 by volume mixture of PC/DME.

DETAILED DESCRIPTION OF THE INVENTION

Figure 1:
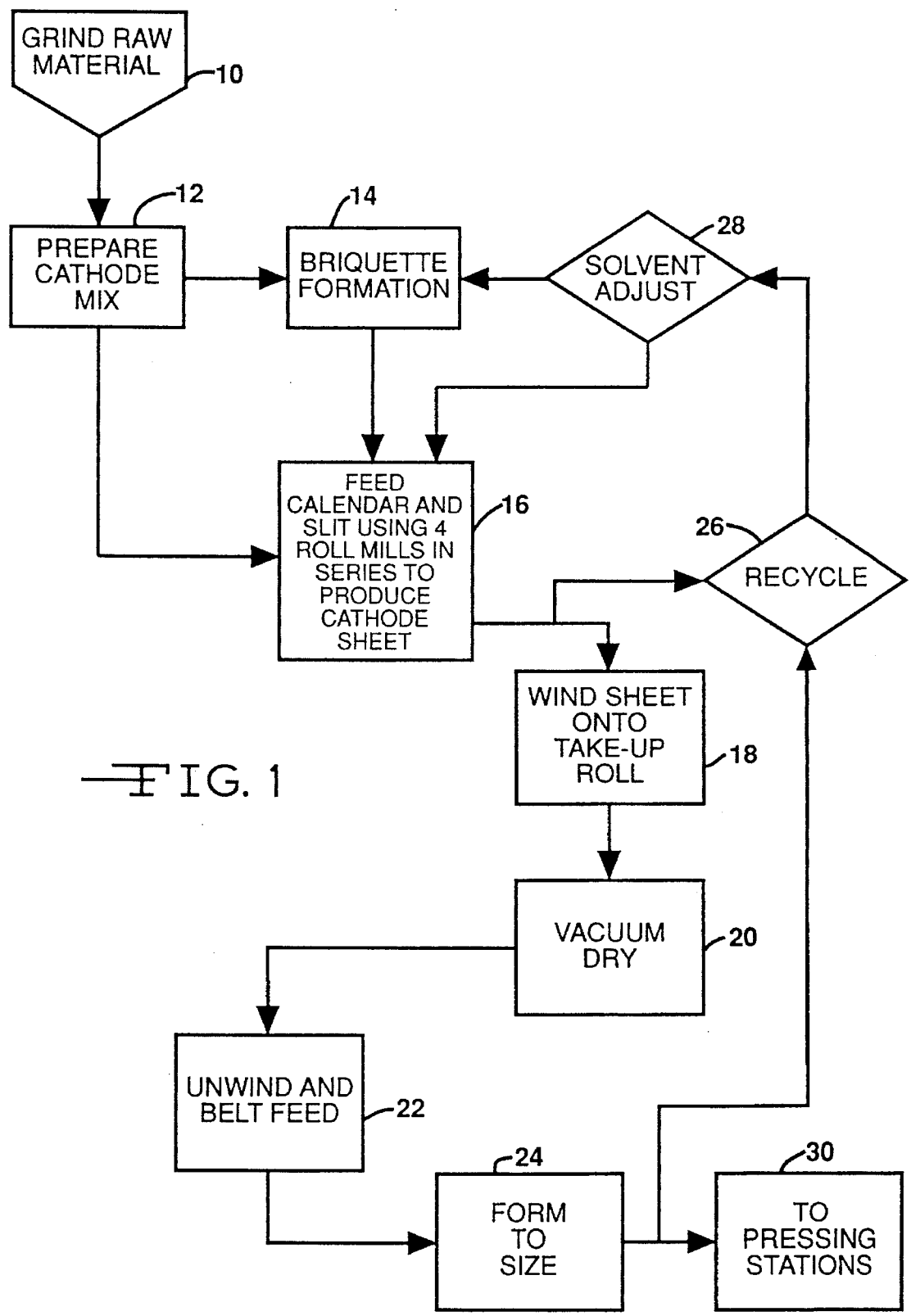
FIG. 1 is a block diagram and flow chart illustrating the steps involved in making a free-standing sheet of cathode active material for use in the high pulse power cell of the present invention.
Figure 2:
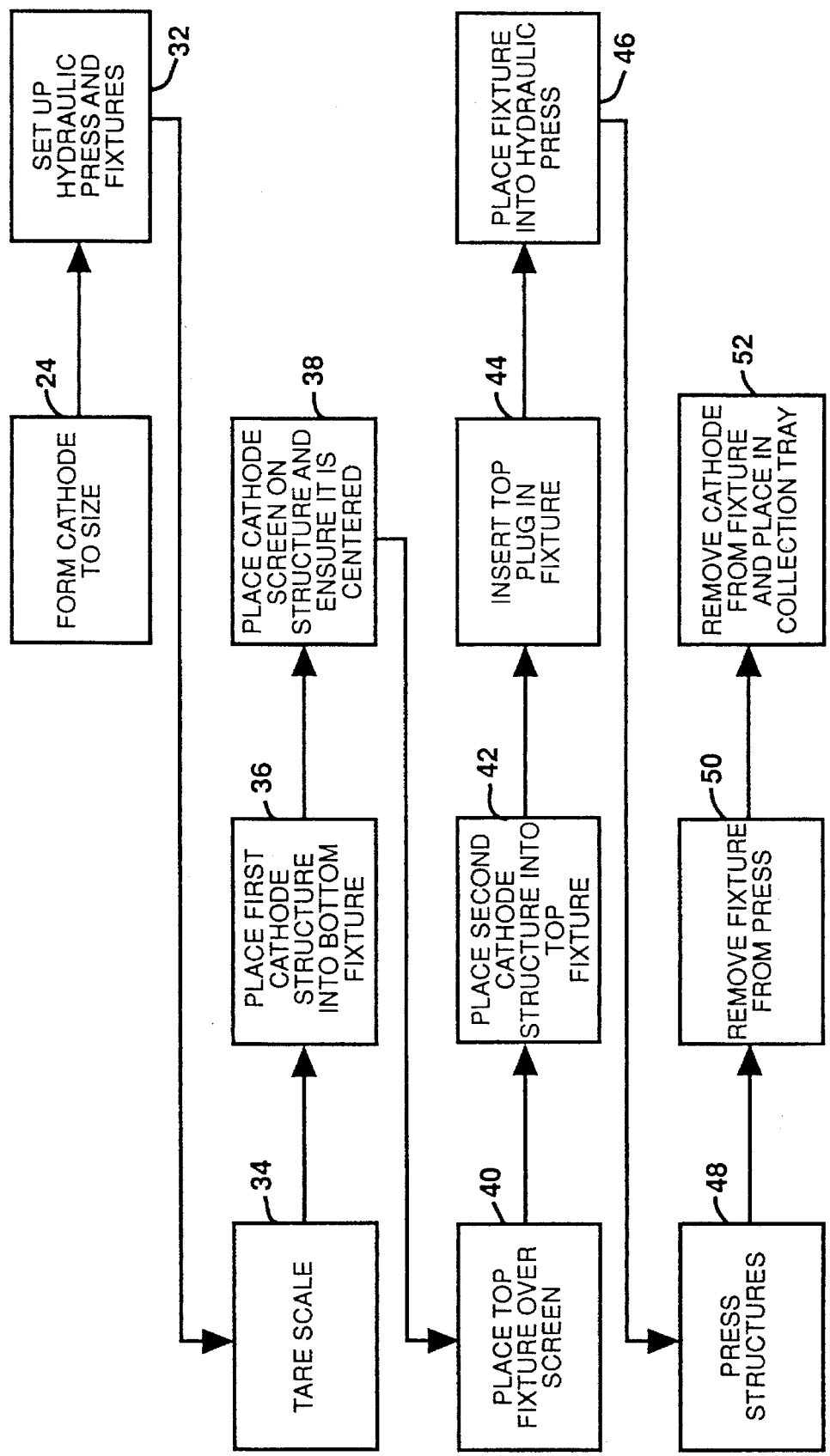
FIG. 2 is a block diagram and flow chart illustrating the steps involved in manufacturing a cathode component for use in an electrochemical cell from a free-standing sheet of cathode active material.

The cell of the present invention has an anode comprising a metal selected from Group IA of the Periodic Table of Elements, including lithium, sodium, potassium, etc., and their alloys and intermetallic compounds including, for example Li—Si, Li—B and Li—Si—B alloys and intermetallic compounds. The preferred anode comprises lithium, and the more preferred anode comprises a lithium alloy, the preferred lithium alloy being lithium-aluminum with the aluminum comprising from between about 0% to about 50% by weight of the alloy. The greater the amount of aluminum present by weight in the alloy the lower the energy density of the cell.

The form of the anode may vary, but preferably, the anode is a thin metal sheet or foil of the anode metal, pressed or rolled on a metallic anode current collector to form an anode component. A nickel anode current collector is preferred. In the cell of the present invention, the anode component has an extended tab or lead of the same material as the current collector or integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical cell of the present invention further includes a solid cathode of an electronically conductive composite material which serves as the other electrode of the cell. The electrochemical reaction at the cathode involves conversion of ions which migrate from the anode to the cathode into atomic or molecular forms. The solid cathode material may comprise a metal element, a metal oxide, a metal sulfide, a mixed metal oxide, and combinations thereof. Suitable cathode materials include silver vanadium oxide, copper silver vanadium oxide, manganese dioxide, titanium disulfide, copper oxide, copper sulfide, iron sulfide, iron disulfide, and mixtures thereof.

Preferably, the solid cathode material comprises a mixed metal oxide formed by the chemical addition, reaction or otherwise intimate contact of various metal oxides or metal oxide/elemental metal combinations, preferably during thermal treatment, addition reaction, sol-gel formation, chemical vapor deposition or hydrothermal synthesis in mixed states, as is well known to those skilled in the art. The materials thereby produced contain metals and oxides of Groups IB, IIB, IIIB, IVB, VB, VIB, VIIB and VIIIB of the Periodic table of Elements, which includes the noble metals and/or their oxide compounds.

In one preferred aspect of the mixed metal oxide cathode material of the present invention, readily decomposable compounds consisting of metals from Groups IB, IIB, IIIB, IVB, VB, VIB and VIIB as well as similarly decomposable compounds from Group VIIIB are thermally treated so as to effect the rapid preparation of the oxides or the respective metal elements themselves to be utilized further in the preparation of the cathode material. Such readily decomposable materials include, but are not limited to, those classes of compounds known as nitrates, nitrites, carbonates and/or ammonium salts. These precursor materials (i.e. nitrates, nitrites, carbonates, ammonium compounds, etc.) may be decomposed in a combined state or individually decomposed and thereafter combined in an oxide-decomposable metal salt compound and subsequently decomposed to form the mixed metal oxide cathode material. For a more detailed description of the preparation of a mixed metal oxide cathode material by the decomposition reaction just described, reference is made to U.S. Pat. No. 4,310,609 to Liang et al., which is assigned to the assignee of the present invention and the disclosure of which is hereby incorporated by reference.

For a more detailed description of the preparation of the mixed metal oxide silver vanadium oxide as the cathode active material by a chemical addition reaction of vanadium pentoxide and various silver-containing constituents, reference is made to U.S. patent application Ser. Nos. 08/090,574, 08/066,982 and 08/071,518, which are assigned to the assignee of the present invention and the disclosures of which are hereby incorporated by reference. Further, for a more detailed description of the preparation of silver vanadium oxide cathode active material by sol-gel formation, reference is made to U.S. patent application Ser. No. 08/271,154, which is assigned to the assignee of the present invention and the disclosure of which is hereby incorporated by reference.

Such cathode active materials are preferably first formed into a free-standing cathode sheet before being pressed onto a suitable current collector for use in the high energy density electrochemical cell of the present invention. As illustrated in the block diagram flow chart in FIG. 1, cathode active material in granular form is first comminuted to reduce its particle size. This is done by comminuting the cathode active material in an attrition or grinding step 10 to reduce its particle size. A ball mill or vertical ball mill is preferred and typical grinding time ranges from between about 10 to 15 minutes. The finely divided cathode active material is preferably mixed with carbon black and/or graphite as conductive diluents and a powder fluoro-resin such as polytetrafluoroethylene powder as a binder material to form a depolarizer cathode admixture in the step designated 12. Other suitable binder materials that are useful with the cathode admixture of the present invention include ethylene propylenedienemonomer (EPDM) and polyvinylidene fluoride (PVDF). Preferably, the admixture comprises about 3 weight percent of the conductive diluents and about 3 weight percent of the binder material with the balance consisting of the cathode active material. This is typically done in a solvent of either water or an inert organic medium such as mineral spirits. The mixing process provides for homogeneity in the admixture and for fibrillation of the fluoro-resin to ensure structural integrity in the final cathode sheet product. In some cases, no electronic conductor material is required. In any event, the percent of cathode active material is preferably held between about 80 weight percent to about 99 weight percent.

Following the mixing step, the admixture is removed from the mixer as a paste that can be fed into a series of roll mills which compact or calendar the cathode material into a thin sheet having a tape form, or the cathode admixture first can be run through a briquette mill in the step designated 14. In the latter case, the cathode admixture is formed into small pellets which are then fed into the calendar roll mills.

Typically, the compacting step 16 is performed by roll mills comprising two to four calendar mills that serve to press the admixture between rotating rollers to provide the cathode active material as a free-standing sheet in the form of a continuous tape. The cathode tape preferably has a thickness in the range of from between about 0.004 inches to about 0.020 inches. The outer edges of the tape leaving the rollers are then trimmed and the finished tape is wound up on a take-up reel as indicated at 18 to form a roll of the cathode active material. This material is subsequently subjected to a drying step 20 under vacuum conditions to remove any residual solvent and/or water from the cathode active material. Alternatively, the process can include the dropwise addition of a liquid electrolyte into the cathode admixture prior to the admixture being subjected to the compacting step 16. This serves to enhance the performance and rate capacity of an assembled electrochemical cell incorporating the free-standing sheet of cathode active material.

As shown in FIG. 1, the method for manufacturing the free-standing cathode sheet of the present invention contains several feedback loops that serve to recycle the cathode active material should the quality control not be up to an acceptable level. This contributes to the process yield as very little cathode material is actually lost to waste. In this manner, after the cathode admixture is calendered during step 16 by the series of calendar mills, if the resulting tape is too thin or otherwise of insufficient quality, the tape is sent to a recycler, indicated as step 26, that reintroduces the cathode admixture into the feed line entering the briquette mill 14 or the calendar mills 16, as the case may be. If needed, the solvent concentration is adjusted during step 28 as needed to provide a more uniform consistency to the cathode admixture paste for rolling into the free-standing cathode tape. This first recycle step 26 is also useful for reintroducing trimmings and similar leftover cathode active material back into the feed line entering the briquette mill and the calendar mills.

A second recycle loop removes trimmings of the cathode material from the process after the forming operation 24 and feeds this material back into the calendar mills, through the recycler indicated in step 26 and the briquette mill in step 14, if that latter step is included in the process, as previously discussed. Again, the solvent concentration is adjusted during step 28 to produce a paste of the cathode active material that is suitable for rolling into a free-standing cathode tape of uniform cross-sectional thickness.

Upon completion of the drying step 20, the tape of cathode material can be stored for later use, or immediately sent to a forming machine, as shown at 24. The forming machine 24 serves to cut, slit, or otherwise form the continuous tape of cathode active material into cathode structures having a variety of shapes including strips, half-round shapes, rectangular shapes, oblong pieces, or others, that are moved during step 30 to a pressing station for fabrication of a cathode component for use in the high pulse power cell of the present invention.

Figure 3:
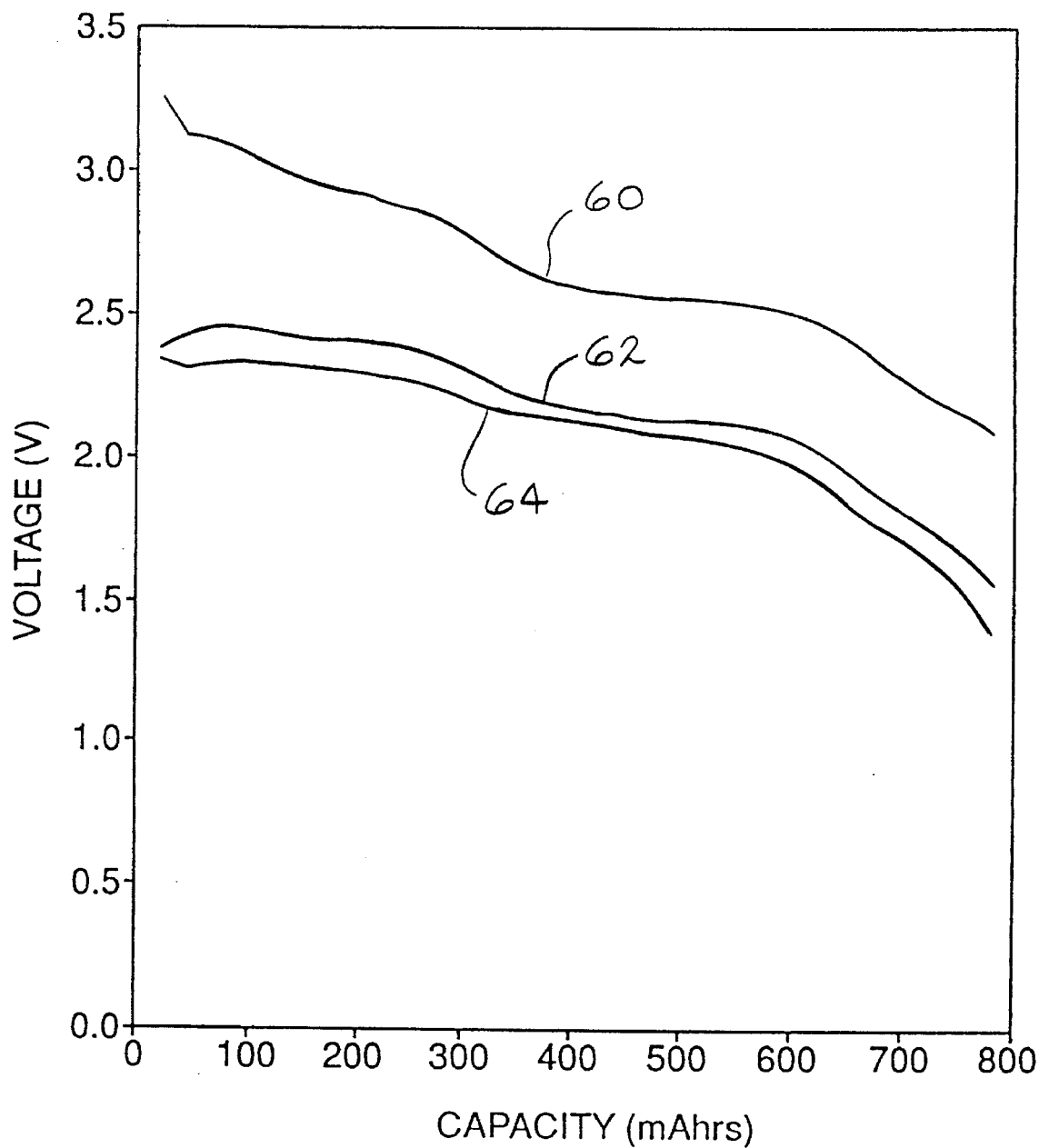
FIGS. 3 and 4 are graphs showing typical discharge curves for representative cells constructed having a titanium cathode current collector and an aluminum cathode current collector, respectively.

The operation of the pressing station 30 is described in greater detail in FIG. 3, wherein a hydraulic press having platens or fixtures is provided at 32. Receptacle cups for the punched cathode plates are weighted on a tare scale during step 34, and as a quality control check, selected ones of the cathode plates are weighted to insure cross-sectioned uniformity. To build a cathode component, a first plate is placed in a bottom fixture during step 36 and a cathode current collector, preferably an aluminum metal screen, is placed on top of the plate during step 38. A top press fixture is then positioned on the bottom fixture and over the current collector screen as indicated at 40. This fixture receives a second shaped cathode structure during step 42 followed by a top plug during step 44 which closes the fixture assembly. The fixture assembly is then inserted into the hydraulic press as indicated at 46 which compresses the two cathode structures together 48 with the aluminum cathode current collector sandwiched therebetween to form the cathode component as a laminate. In some situations, it may be desired to press cathode structures on only one side of the current collector.

Following the pressing step, the fixture assembly is removed from the press during step 50 and the cathode component is separated from the press fixture and placed into a collection tray during step 52. Cathode components containing significant amounts of metallic electrode active material, i.e., from between about 80% to 99% by volume are inherently rigid in comparison to carbonaceous materials. As such, metallic materials suitable for use as electrode active materials have sufficient interstitial space between adjacent metallic molecules to provide for intercalation therein, as is well known to those skilled in this art. Being rigid, they can withstand the pressing step without losing their ability to intercalate metal ions produced by the anode, even without the propant function provided by the solvent and water. In that respect, metallic electrode active materials can be dried either before or after being pressed into a cathode component. The cathode component can then be stored for later use, or the cathode component can be incorporated into a high pulse power cell of the present invention.

For a more detailed description of a process for making cathode components for use in the high pulse power cell of the present invention, reference is made to U.S. Pat. No. 5,435,874 which is assigned to the assignee of the present invention and incorporated herein by reference. The prepared cathode components can be used as either a solid cathode prepared by directly pressing the material into a cell can assembly or a spirally wound cathode structure similar to a "jellyroll."

The high pulse power cell of the present invention includes a suitable separator to provide physical separation between the anode and cathode active electrodes. The separator is of electrically insulative material to prevent an internal electrical short circuit between the electrodes, and the separator material also is chemically unreactive with the anode and cathode active materials and both chemically unreactive with and insoluble in the electrolytic solution. In addition, the separator material has a degree of porosity sufficient to allow flow therethrough of the electrolytic solution during the electrochemical reaction of the cell. Illustrative separator materials include non-woven glass, polypropylene, polyethylene, glass fiber material, ceramics, polytetrafluorethylene membrane commercially available under the designations ZITEX (Chemplast Inc.), polypropylene membrane, commercially available under the designation CELGARD (Celanese Plastic Company Inc.) and DEXIGLAS (C. H. Dexter, Div., Dexter Corp.)

The form of the separator typically is a sheet which is placed between the anode and cathode electrodes and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The electrochemical cell of the present invention further includes a nonaqueous, ionically conductive electrolytic solution operatively associated with the anode and the cathode electrodes. The electrolytic solution serves as a medium for migration of ions between the anode and the cathode during the electrochemical reactions of the cell. The electrolytic solution is comprised of an inorganic salt dissolved in a nonaqueous solvent, and more preferably, an alkali metal salt dissolved in a family of cyclic esters and diethers. The nonaqueous solvents suitable for the present invention are chosen so as to exhibit those physical properties necessary for ionic transport (low viscosity, low surface tension, and wettability). Suitable nonaqueous solvents may be any one or more of the organic solvents which are substantially inert to the anode and cathode electrode materials, such as tetrahydrofuran, propylene carbonate, methyl acetate, diglyme, triglyme, tetraglyme, acetonitrile, dimethyl sulfoxide, dimethyl formamide, dimethyl acetamide, 1,2-dimethoxyethane and mixtures thereof. A preferred solvent comprises a 50/50 mixture (by volume) of propylene carbonate (PC) and dimethoxyethane (DME).

The preferred electrolyte solution of the present invention comprises an inorganic salt having the general formula $MM'F_6$ wherein M is an alkali metal similar to the alkali metal comprising the anode and M' is an element selected from the group consisting of phosphorous, arsenic and antimony. Examples of salts yielding $M'F_6$ are: hexafluorophosphate ($PF_6$) and hexafluoroarsenate ($AsF_6$) and hexafluoroantimonate ($SbF_6$). The most preferred electrolytic solution comprises at least one ion-forming alkali metal salt of hexafluorophosphate dissolved in a suitable organic solvent wherein the ion-forming alkali metal is similar to the alkali comprising the anode. Thus, in the case of an anode comprising lithium, the alkali metal salt of the electrolytic solution of the present invention comprises lithium hexafluorophosphate dissolved in a 50/50 solvent mixture (by volume) of PC/DME. For a more detailed description of a nonaqueous electrolytic solution for use in the high pulse power cell of the present invention, reference is made to U.S. patent application Ser. No. 08/169,002, which is assigned to the assignee of the present invention and incorporated herein by reference.

The assembly of the cell described herein is preferably in the form of a wound element cell. That is, the fabricated cathode, anode and separator are wound together in a "jellyroll" end type configuration or "wound element cell stack" such that the anode is on the outside of the roll to make electrical contact with the cell case in a case negative configuration. Using suitable top and bottom insulators, the wound cell stack is inserted into a metallic case of a suitable size dimension. The metallic case may comprise materials such as stainless steel, mild steel, nickel-plated mild steel, titanium or aluminum, but not limited thereof, so long as the metallic material is compatible for use with components of the cell.

The cell header comprises a metallic disc-shaped body with a first hole to accommodate a glass-to-metal seal/ terminal pin feedthrough and a hole for electrolytic solution filling. The glass used is of a corrosion resistant type having from between about 0% to about 50% by weight silicon such as CABAL 12, TA 23 or FUSITE 425 or FUSITE 435. The positive terminal pin feedthrough can comprise molybdenum, titanium, nickel alloy, or stainless steel. The cell header comprises elements having compatibility with the other components of the electrochemical cell and is for resistant to corrosion. The cathode lead is welded to the positive terminal pin in the glass to metal seal and the header is welded to the case containing the electrode stack. The cell is thereafter filled with the electrolytic solution described hereinabove and hermetically sealed such as by close-welding a stainless steel ball over the fill hole, but not limited thereto. This above assembly describes a case negative cell which is the preferred construction of the high pulse power cell of the present invention. As is well known to those skilled in the art, the electrochemical system of the present invention can also be constructed in a case positive configuration.

The electrochemical cell of the present invention operates in the following manner. When the ionically conductive electrolytic solution becomes operatively associated with the anode and the cathode of the cell, an electrical potential difference is developed between terminals operatively connected to the anode and the cathode. The electrochemical reaction at the anode includes oxidation to form metal ions during discharge of the cell. The electrochemical reaction at the cathode involves conversion of ions which migrate from the anode to the cathode into atomic or molecular forms. It is observed that the electrochemical systems of this invention have a wide operating temperature range, of between about −20° C. to about +120° C.

The electrochemical cell according to the present invention is illustrated further by the following Examples, which are given to enable those skilled in the art to more clearly understand and practice the present invention. The Examples should not be considered as a limitation of the scope of the invention, but are described as being illustrative and representative thereof.

EXAMPLE I

Comparison Of Titanium And Aluminum Cathode Current Collectors

Seven cells were constructed having an external volume of approximately 5 cc and comprising the silver vanadium oxide cathode active sheet material of the present invention. Four of the cells contained sheeted cathodes applied to the current collector material used in the prior art, i.e., titanium, and a lithium foil anode. These cells were vacuum filled with a 1M $LiAsF_6$ PC/DME (50:50) electrolytic solution. The remaining three cells contained sheeted cathodes applied to the current collector material of the present invention, i.e., aluminum, and a lithium aluminum alloy foil anode. These cells were vacuum filled with a 1M $LiPF_6$ PC/DME (50:50) electrolytic solution. The cathode sheet material incorporated into both groups of cells was comprised of a mixed metal oxide, specifically an admixture comprising silver vanadium oxide, conductive carbon additives and a suitable binder. Both the cathode and anode were encapsulated with a 0.001 inch polypropylene separator, wound together in a flattened jellyroll configuration, and housed in a prismatic case. The active surface area of the electrodes was about 114 $cm^2$.

A constant resistive load of 7.5 kΩ was applied to all seven cells during an initial pre-discharge period. The pre-discharge period is referred to as burn-in and depleted the cells of approximately 1% of their theoretical capacity. Following burn-in, the cells were discharged to 1.4 V by the application of a 2.0 Amp pulse train every 30 minutes. The pulse train consisted of four 10 second 2.0 Amp pulses with 15 second rests between each pulse.

Figure 4:
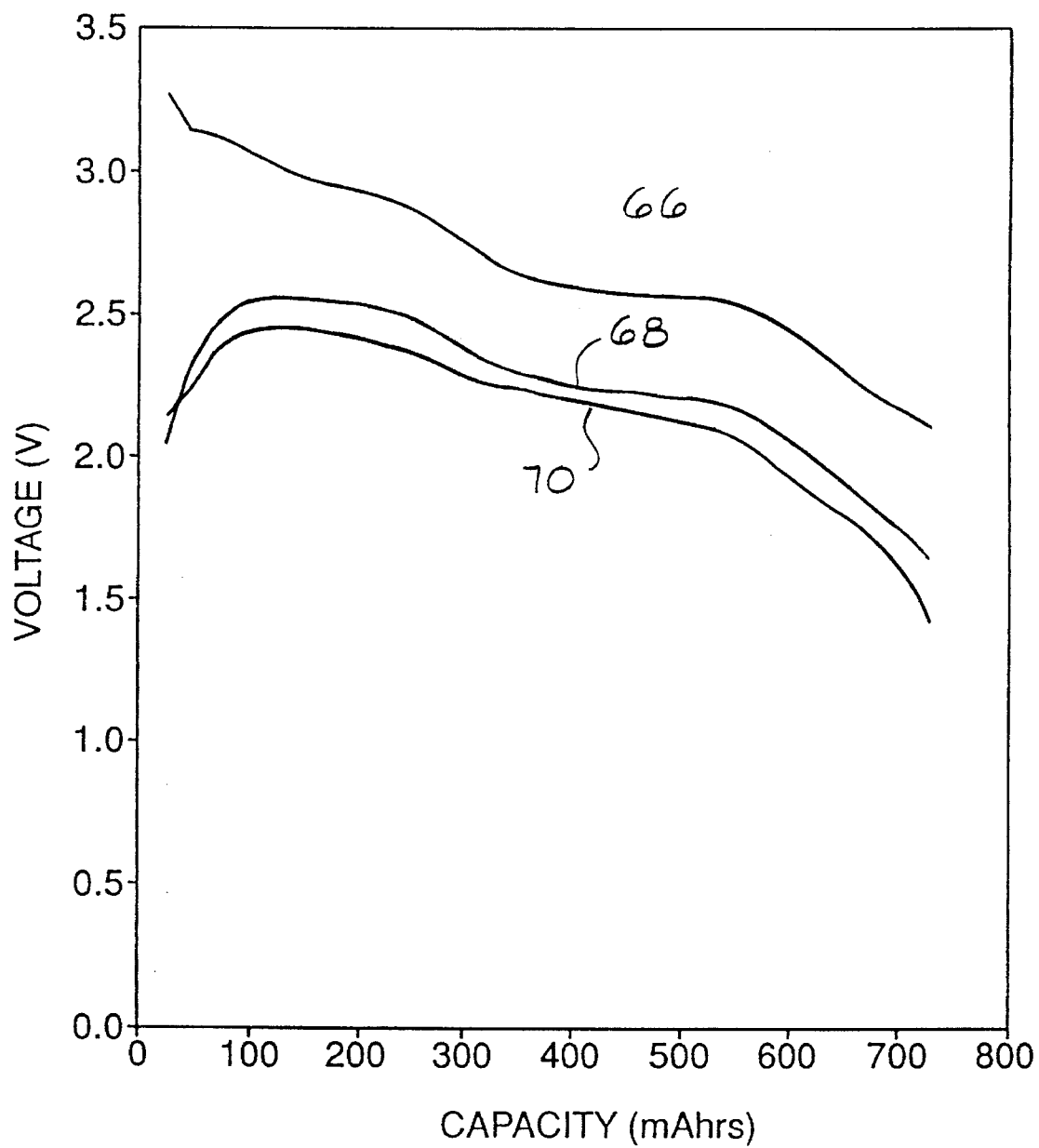

FIGS. 3 and 4 are graphs showing typical discharge curves for representative cells constructed according to this example and having a titanium cathode current collector (FIG. 3) and an aluminum cathode current collector (FIG. 4). In FIG. 3, curve 60 was constructed from the pre-pulse open circuit voltage with no load of the representative cell having the titanium cathode current collector, curve 62 was constructed from the minima of the first pulse of each pulse train of this cell and curve 64 was constructed from the minimum of the fourth pulse of each pulse train. Contrastingly, in FIG. 4, curve 66 was constructed from the pre-pulse open circuit voltage with no load of the cell constructed according to the present invention having the aluminum cathode current collector, curve 68 was constructed from the minima of the first pulse of each pulse train of this cell and curve 70 was constructed from the minima of the fourth pulse of each pulse train.

Table 1 shows the average (±1 standard deviation) pre burn-in and post burn-in open circuit (OC) voltage, capacity delivered to 2.0 V, 1.7 V and 1.5 V and cathode efficiency to 2.0 V, 1.7 V and 1.5 V for each experimental cell group having the titanium and aluminum cathode current collectors, respectively. Cathode efficiency is defined as the percentage of theoretical capacity delivered during discharge.

TABLE 1

| Electrical Data | Titanium Cathode Current Collector Lithium Foil Anode 1M LiAsF$_6$PC/ DME(50:50) | Aluminum Cathode Current Collector Lithium Aluminum Foil Anode 1M LiPF$_6$PC/DME(50:50) |
|---|---|---|
| Pre Burn-In OC Voltage | 3.290 ± 0.068 V | 3.225 ± 0.007 V |
| Post Burn-In OC Voltage | 3.174 ± 0.009 V | 3.169 ± 0.001 V |
| Capacity Delivered to ... | | |
| 2.0 V | 0.491 ± 0.066 Ahrs | 0.629 ± 0.006 Ahrs |
| 1.7 V | 0.651 ± 0.051 Ahrs | 0.742 ± 0.007 Ahrs |
| 1.5 V | 0.719 ± 0.053 Ahrs | 0.786 ± 0.008 Ahrs |
| Cathode Efficiency to ... | | |
| 2.0 V | 56.2 ± 6.8% | 71.2 ± 0.5% |
| 1.7 V | 74.5 ± 3.3% | 84.0 ± 0.6% |
| 1.5 V | 82.2 ± 2.9% | 88.9 ± 0.5% |

The cells built according to the present invention with an aluminum cathode current collector, lithium aluminum alloy foil anode and filled with 1M LiPF$_6$ PC/DME(50:50) electrolytic solution were 15.0%, 9.5%, and 6.7% more efficient at voltage cut-offs of 2.0 V, 1.7 V and 1.5 V, respectively, than the prior art cells built with a titanium cathode current collector, lithium foil anode and filled with 1M LiAsF$_6$ PC/DME(50:50) electrolyte. The noted increases in discharge efficiencies are attributable to the cooperative electrochemical action these specific materials have when combined with each other. In other words, the combination of cell materials preferred for the high pulse power cell of the present invention has a synergistic effect on cell performance that is statistically significant at a 99% confidence level at each voltage cut-off.

Further, the electrochemical cells of the present invention activated with the electrolytic solution comprising lithium hexaflourophosphate exhibited reduced reactivity with the anode in comparison to the prior art cells activated with a lithium hexaflouroarsenate electrolytic solution. This diminished reactivity reduced the thickness of the passivation film on the anode, which film undesirably causes voltage delay. Additionally, the lower reactivity with the lithium aluminum alloy foil anode results in reduced heat dissipation and in turn further benefits cell efficiency. This is an unexpected benefit of the present cell system since generally improvements in voltage delay are realized at the expense of heat dissipation.

EXAMPLE II

Comparison Of Titanium And Aluminum Cathode Current Collectors

Four hermetically sealed prismatic lithium/silver vanadium oxide cells were constructed in the standard configuration of the prior art. The cathode admixture consisted of silver vanadium oxide, carbon, graphite, and a suitable binder. The mix was applied to titanium cathode current collectors for the first two cells and to aluminum cathode current collectors for the second two cells. The cathodes of all four cells were encapsulated in a polypropylene film laminate separator. The anode of each cell was a strip of metallic lithium, also encapsulated in a polypropylene film laminate separator. The anodes were wrapped accordion style around the cathode plates. The cell assemblies were then assembled in prismatic housings and vacuum filled with 1M LiAsF$_6$ PC/DME (50:50) electrolyte.

The cells were placed on a 12.1 K$\Omega$ background load and pulse discharged every 60 days with a 2.0 Amp pulse train. The pulse train consisted of four 10 second pulses with 15 second rest periods between each pulse. Following the application of six such pulse trains, the cells were discharged to 1.0 V under the background load.

Table 2 shows selected pulse train voltages, in mV, for each cell tested. The particular pulse train voltages shown are the pre-pulse background voltage (pre-pulse), the minimum voltage recorded during the first pulse of the pulse train (p1 min), the minimum voltage recorded during the fourth pulse of the pulse train (p4 min), the difference between the last voltage recorded during the first pulse of the train and the minimum voltage recorded for that pulse (p1 end–p1 min), the difference between the pre-pulse voltage and p1 min (pre p1–p1 min), and the difference between the pre-pulse voltage and p4 min (pre p1–p4 min). The average and standard deviation of the selected data points are also indicated in Table 2 for each cathode current collector material.

TABLE 2

| | Pulse Train Data: Ti vs Al Screen Comparison | | | | | | | | | | | |
|---|---|---|---|---|---|---|---|---|---|---|---|---|
| | | | | | | | 12.1 k$\Omega$ background load with 2.0 Amp pulse train applied every 60 days | | | | | |
| | Pre-Pulse | | P1 Min | | P4 Min | | P1 End-P1 Min | | Pre P1–P1 Min | | Pre P1–P4 Min | |
| | Cell 1 | Cell 2 | Cell 1 | Cell 2 | Cell 1 | Cell 2 | Cell 1 | Cell 2 | Cell 1 | Cell 2 | Cell 1 | Cell 2 |
| Pulse Train 1 | | | | | | | | | | | | |
| Ti Screen | 3333 | 3329 | 2250 | 2220 | 2350 | 2320 | 120 | 110 | 1083 | 1109 | 983 | 1009 |
| Al Screen | 3329 | 3332 | 2260 | 2380 | 2390 | 2475 | 100 | 120 | 1069 | 952 | 949 | 857 |

TABLE 2-continued

| | | | | | | | | | | | | |
|---|---|---|---|---|---|---|---|---|---|---|---|---|
| Pulse Train 2 | | | | | | | | | | | | |
| Ti Screen | 3118 | 3113 | 2300 | 2292 | 2261 | 2253 | 93 | 93 | 819 | 821 | 857 | 860 |
| Al Screen | 3113 | 3115 | 2246 | 2356 | 2246 | 2366 | 73 | 129 | 867 | 759 | 867 | 749 |
| Pulse Train 3 | | | | | | | | | | | | |
| Ti Screen | 2639 | 2629 | 2109 | 2112 | 2063 | 2056 | 0 | 0 | 530 | 517 | 576 | 570 |
| Al Screen | 2625 | 2634 | 2163 | 2197 | 2146 | 2158 | 12 | 0 | 462 | 437 | 479 | 476 |
| Pulse Train 4 | | | | | | | | | | | | |
| Ti Screen | 2537 | 2534 | 1672 | 1653 | 1760 | 1741 | 122 | 117 | 865 | 881 | 777 | 793 |
| Al Screen | 2534 | 2537 | 1663 | 1731 | 1848 | 1863 | 192 | 144 | 871 | 806 | 686 | 674 |
| Pulse Train 5 | | | | | | | | | | | | |
| Ti Screen | 2432 | 2415 | 1616 | 1562 | 1482 | 1406 | 0 | 0 | 816 | 853 | 950 | 1009 |
| Al Screen | 2397 | 2422 | 1636 | 1687 | 1533 | 1575 | 0 | 0 | 761 | 735 | 864 | 847 |
| Pulse Train 6 | | | | | | | | | | | | |
| TI Screen | 2173 | 2163 | 1067 | 969 | 781 | 623 | 0 | 0 | 1106 | 1194 | 1392 | 1540 |
| Al Screen | 2153 | 2170 | 1194 | 1262 | 898 | 952 | 0 | 0 | 959 | 908 | 1255 | 1218 |

| | Average Pulse Train Data | | | | | |
|---|---|---|---|---|---|---|
| | Pre-Pulse | P1 Min | P4 Min | P1 End-P1 Min | Pre P1—P1 Min | Pre P1–P4 Min |
| Pulse Train 1 | | | | | | |
| Ti Screen | 3331 ± 3 | 2235 ± 21 | 2335 ± 21 | 115 ± 7 | 1096 ± 18 | 996 ± 18 |
| Al Screen | 3331 ± 2 | 2320 ± 85 | 2428 ± 67 | 110 ± 14 | 1011 ± 83 | 903 ± 65 |
| Pulse Train 2 | | | | | | |
| Ti Screen | 3116 ± 4 | 2296 ± 6 | 2257 ± 6 | 93 ± 0 | 820 ± 2 | 859 ± 2 |
| Al Screen | 3114 ± 1 | 2301 ± 78 | 2306 ± 85 | 101 ± 40 | 813 ± 76 | 809 ± 83 |
| Pulse Train 3 | | | | | | |
| Ti Screen | 2634 ± 7 | 2111 ± 2 | 2060 ± 5 | 0 ± 0 | 524 ± 9 | 573 ± 4 |
| Ai Screen | 2630 ± 6 | 2190 ± 24 | 2152 ± 8 | 6 ± 8 | 450 ± 18 | 478 ± 2 |
| Pulse Train 4 | | | | | | |
| Ti Screen | 2536 ± 2 | 1663 ± 13 | 1751 ± 13 | 120 ± 4 | 873 ± 11 | 785 ± 11 |
| Al Screen | 2536 ± 2 | 1697 ± 48 | 1856 ± 11 | 168 ± 34 | 839 ± 46 | 680 ± 8 |
| Pulse Train 5 | | | | | | |
| Ti Screen | 2424 ± 12 | 1589 ± 38 | 1444 ± 54 | 0 ± 0 | 835 ± 26 | 980 ± 42 |
| Al Screen | 2410 ± 18 | 1662 ± 36 | 1554 ± 30 | 0 ± 0 | 748 ± 18 | 856 ± 12 |
| Pulse Train 6 | | | | | | |
| Ti Screen | 2168 ± 7 | 1018 ± 69 | 702 ± 112 | 0 ± 0 | 1150 ± 62 | 1466 ± 105 |
| Al Screen | 2162 ± 12 | 1228 ± 48 | 925 ± 38 | 0 ± 0 | 934 ± 36 | 1237 ± 26 |

(Note: The average of each data point ± 1 standard deviation is indicated)

Figure 5:
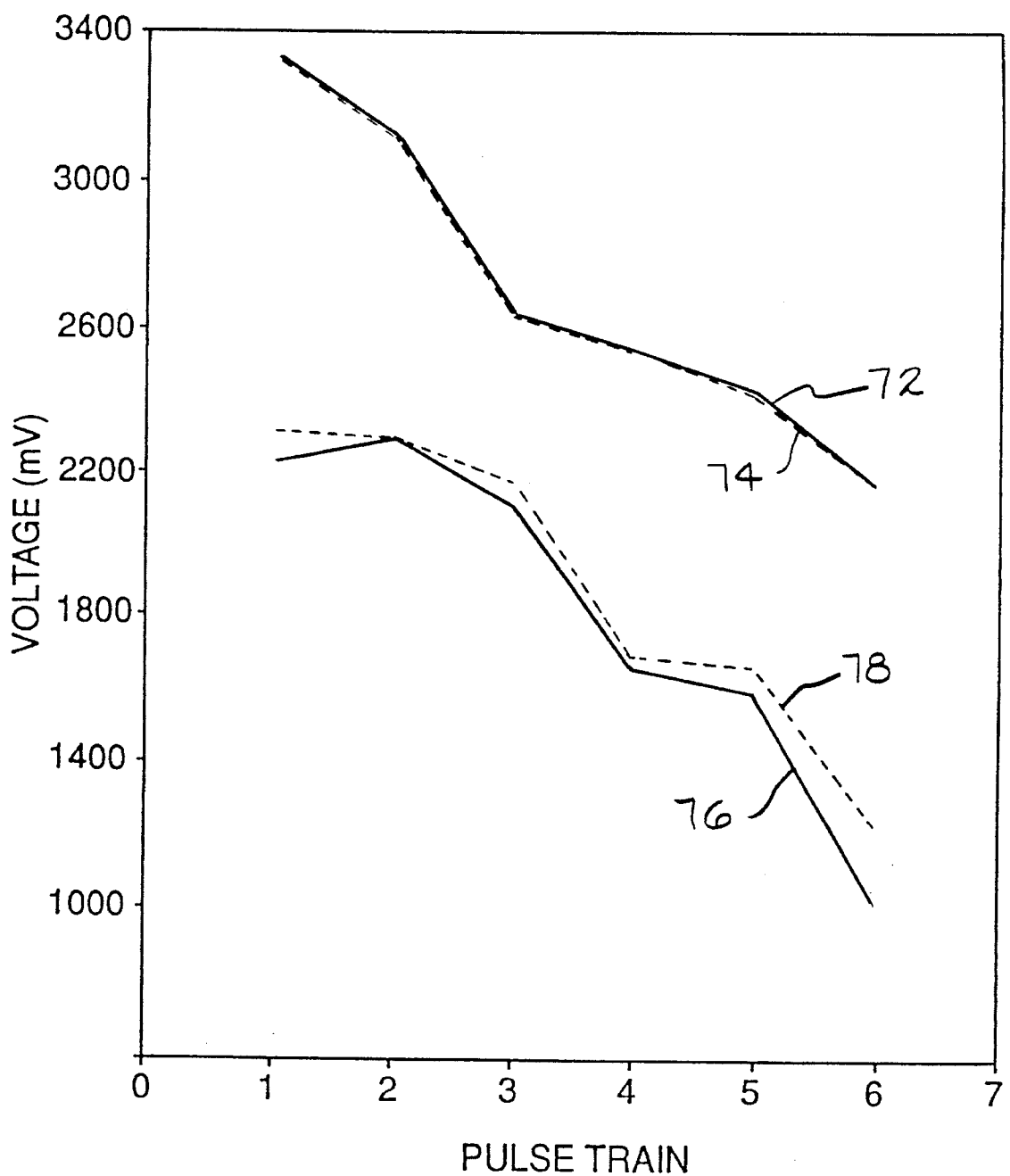
FIGS. 5 and 6 are graphs showing discharge curves versus pulse train for cells constructed having titanium and aluminum current collectors.
Figure 6:
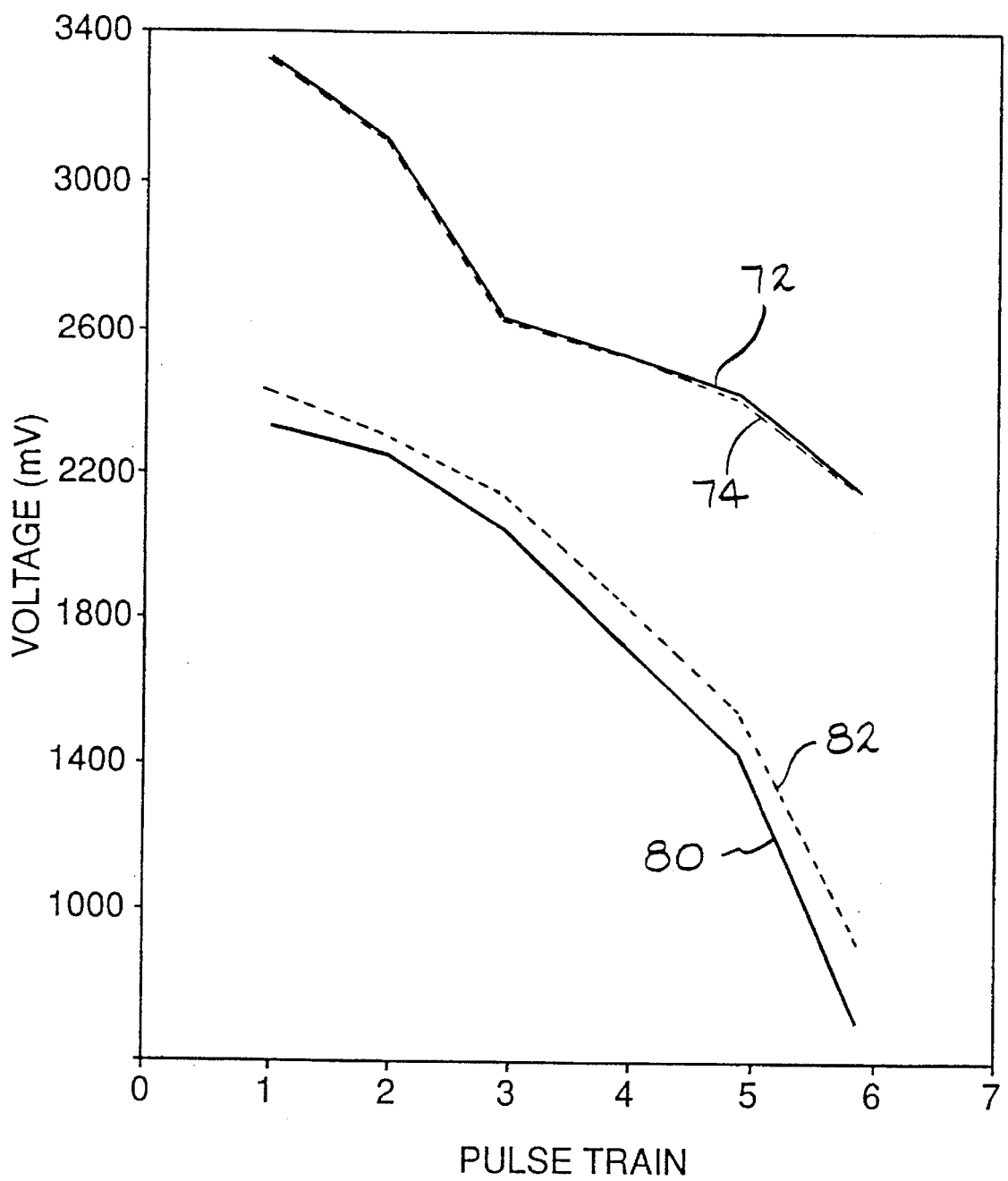

The pre-pulse voltages of the cells were equivalent, regardless of cathode current collector material, throughout pulse testing. The p1 end–p1 min voltages were also equivalent for all of the pulse trains except pulse train 4, where the aluminum screen cells had slightly higher voltages. The p1 min voltages of the cells with the aluminum cathode current collectors were higher than those with the titanium cathode current collectors for pulse trains 1, 3, 5 and 6. The p4 min voltages of the cells with the aluminum cathode current collectors were higher than those with the titanium cathode current collectors for pulse trains 1, 3, 4, 5 and 6. The pre p1–p1 min and pre p1–p4 min voltages were correspondingly lower for the aluminum cathode current collectors for pulse trains 1, 3, 5 and 6 and 1, 3, 4, 5 and 6, respectively. These trends are shown graphically in FIGS. 5 and 6. In FIG. 5, curves 72 and 74 were constructed from the average background voltage, i.e., pre-pulse voltage, of the cells construed according to this example having a titanium cathode current collector and an aluminum cathode current collector, respectively, and curves 76 and 78 were constructed from the average p1 min (p1) voltage versus the pulse train of these cells, respectively. In FIG. 6, the average background voltage of the cells used to construct the discharge curves in FIG. 5 is again shown along with curves 80 and 82, which were constructed from the average p4 min (p4) voltage versus the pulse trains for the cells having the titanium and aluminum cathode current collectors, respectively.

After pulse testing was complete, the cells were discharged to 1.0 V under the 12.1 kΩ background load. Table 3 shows the capacity delivered under the load (excluding the capacity delivered during pulsing) and the change in case thickness resulting from discharge under the background load. The cells delivered equivalent amounts of capacity to 2.0 V, 1.7 V and 1.5 V cut-offs and swelled within the same orders of magnitude.

TABLE 3

Capacity Delivered under 12.1K Background Load

| Screen Type | mAhrs to 2.0 V | mAhrs to 1.7 V | mAhrs to 1.5 V | End of Pulsing Thickness | End of Test Thickness | Change in Thickness |
|---|---|---|---|---|---|---|
| Ti | 1765 | 1901 | 1929 | 0.422 | 0.429 | 0.007 |
| Ti | 1734 | 1868 | 1918 | 0.422 | 0.437 | 0.015 |
| Average | 1750 | 1885 | 1924 | 0.422 | 0.433 | 0.011 |
| St Dev | 22 | 23 | 8 | 0.000 | 0.006 | 0.006 |
| Al | 1719 | 1854 | 1912 | 0.422 | 0.443 | 0.021 |
| Al | 1750 | 1885 | 1924 | 0.423 | 0.436 | 0.013 |
| Average | 1735 | 1870 | 1918 | 0.423 | 0.440 | 0.017 |
| St Dev | 22 | 22 | 8 | 0.001 | 0.005 | 0.006 |

Figure 7:
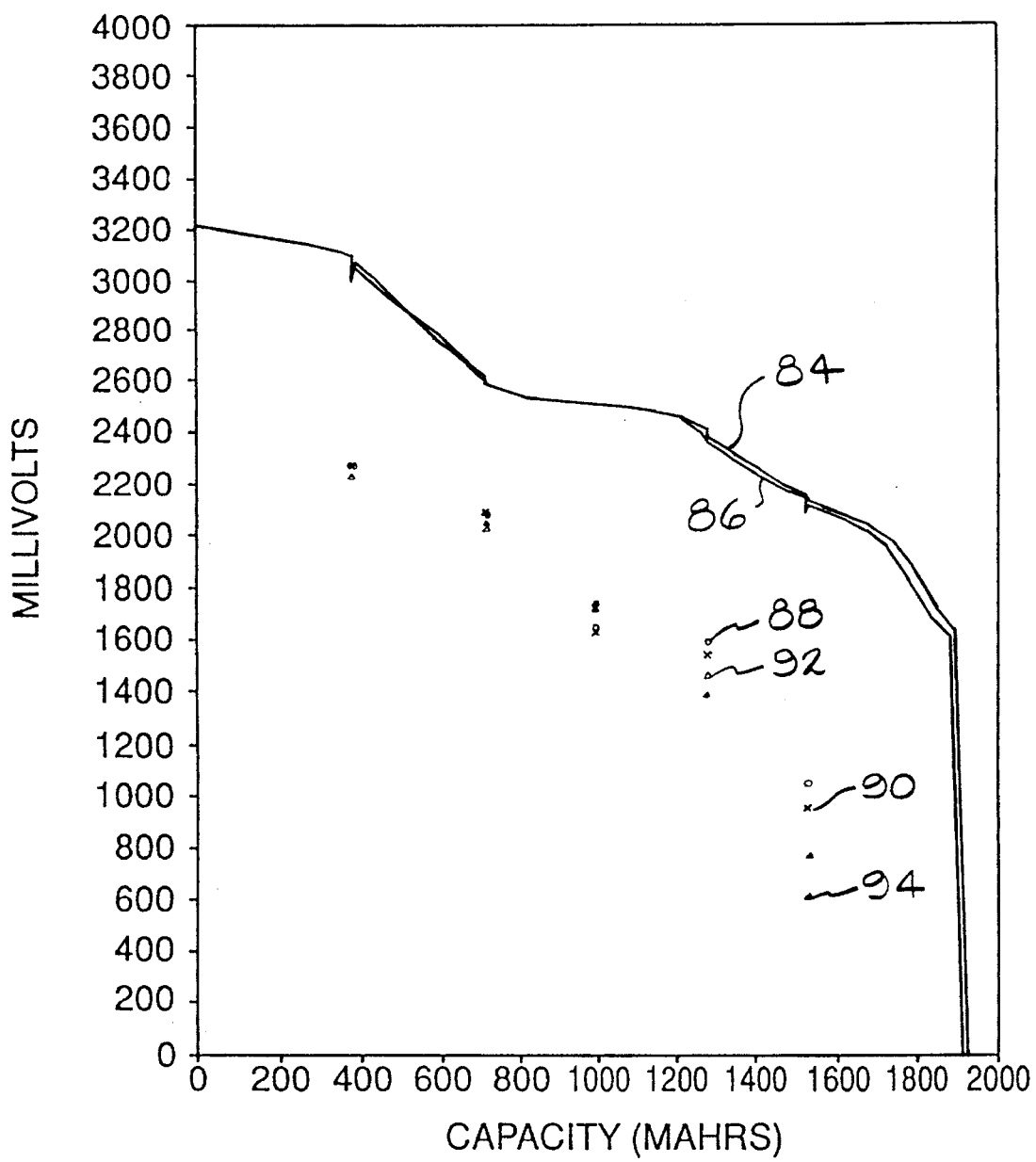
FIGS. 7 and 8 are graphs showing the voltage under background load and the p1 minima and p4 minima pulse train voltages versus delivered capacity of cells having titanium and aluminum cathode current collectors, respectively.
Figure 8:
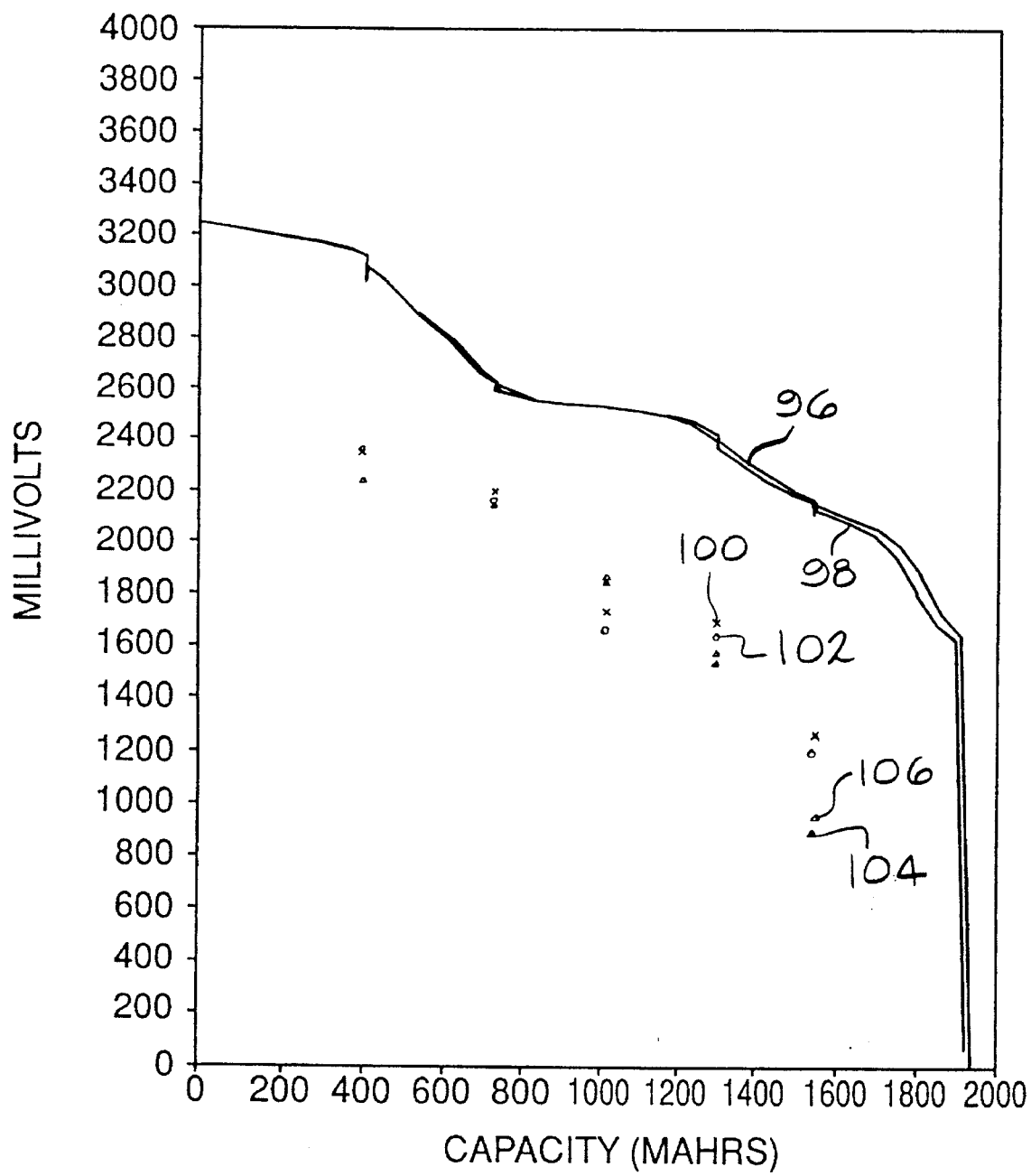

FIGS. 7 and 8 show the voltage under background load and the p1 min and p4 min pulse train voltages versus delivered capacity of the titanium cathode current collector cells and the aluminum cathode current collector cells, respectively. In FIG. 7, curves 84 and 86 were constructed from the background voltage of the two cells in this example having the titanium cathode current collector, curves 88 and 90 were constructed from the p1 min voltage versus delivered capacity of these cells, respectively, and curves 92 and 94 were constructed from the p4 min voltage versus delivered capacity of these cells, respectively. Contrastingly, in FIG. 8, curves 96 and 98 were constructed from the background voltage of the two cells in this example having the aluminum cathode current collector, curves 100 and 102 were constructed from the p1 min voltage versus delivered capacity of these cells, respectively, and curves 104 and 106 were constructed from the p4 min voltage versus delivered capacity of these cells, respectively.

The titanium and aluminum cathode current collectors have comparable performance characteristics in terms of deliverable capacity and case swelling behavior. The aluminum cathode current collector cells have better rate capabilities as indicated by the higher p1 min and p4 min pulse train voltages.

EXAMPLE III

Swelling Of Cells Containing $LiAsF_6$ Versus Cells Containing $LiPF_6$.

A group of cells containing either $LiAsF_6$ or $LiPF_6$ at a concentration of 1 mol·$L^{-1}$ in a 1:1 volume mixture of propylene carbonate and dimethoxyethane was partially discharged through 2 KΩ resistors before being switched to 10 KΩ resistors. The thickness of the cells were recorded throughout the 10 KΩ portion of the discharges. Plots of cell thickness as a function of decreasing voltage under load are presented in FIG. 9 wherein curve 108 was constructed from the $LiAsF_6$ electrolyte salt containing cells and curve 110 was constructed from the $LiPF_6$ electrolyte salt containing cells. Average values of cell thickness at 2000 mV and 1000 mV interpolated from the data used in the plots are presented in Table 4. It can be seen in the FIG. 9 and in Table 4 that the $LiPF_6$ cells were at lower voltages than were the $LiAsF_6$ cells before the onset of increased swelling. The $LiPF_6$ cells had greater thickness at voltages below about 1400 mV but that voltage is not typically seen in implantable medical devices.

TABLE 4

Comparison of Multiplate SVO cell Swelling

| | $LiAsF_6$ | $LiPF_6$ |
|---|---|---|
| Thickness @ 2 V, inches | 0.404 ± 0.010 | 0.352 ± 0.003 |
| Thickness @ 1 V, inches | 0.427 ± 0.006 | 0.437 ± 0.008 |

EXAMPLE IV

Corrosion Of Aluminum Versus Titanium Current Collectors Upon Exposure To $LiPF_6$ In Propylene Carbonate/Dimethoxyethane Electrolytes Aluminum does not corrode in the $LiPF_6$ electrolyte. The surface condition of a variety of aluminum alloys are shown in the photographs in FIGS. 10 to 17. FIGS. 10, 12, 14 and 16 are photographs showing virgin aluminum alloys, i.e., aluminum alloys prior to being used in an electrochemical cell while FIGS. 11, 13, 15 and 17 are photographs showing various aluminum alloy cathode current collectors after use in an electrochemical cell. In constructing the various cells, the aluminum alloy materials were first formed into cathode current collector screens by chemical etching prior to further treatment or by expanding the metal. These treating processes are well known to those skilled in the art.

The thusly treated cathode current collectors were then associated with silver vanadium oxide either in a calendaring step or by pressing the cathode active material onto the current collector according to the present invention and incorporated into high pulse power cells that were discharged under a variety of conditions. Table 5 shows the treatments or conditions to which the various aluminum alloys were subjected. The various aluminum alloys were designated:

1100-0:
 1100 is wrought aluminum with a minimum purity level of 99.00%. 0 (zero) indicates the material has been fully annealed.
1145-H19:
 1145 is wrought aluminum with a minimum purity level of 99.45%. H19 indicates the material has been strain hardened to a particular degree without subsequent thermal treatment.
5052-H19:
 5052 is wrought aluminum alloy that contains 97.2% aluminum, 2.5% magnesium, and 0.25% chromium. H19 indicates the material has been strain hardened to a particular degree without subsequent thermal treatment.

TABLE 5

Figure 10:
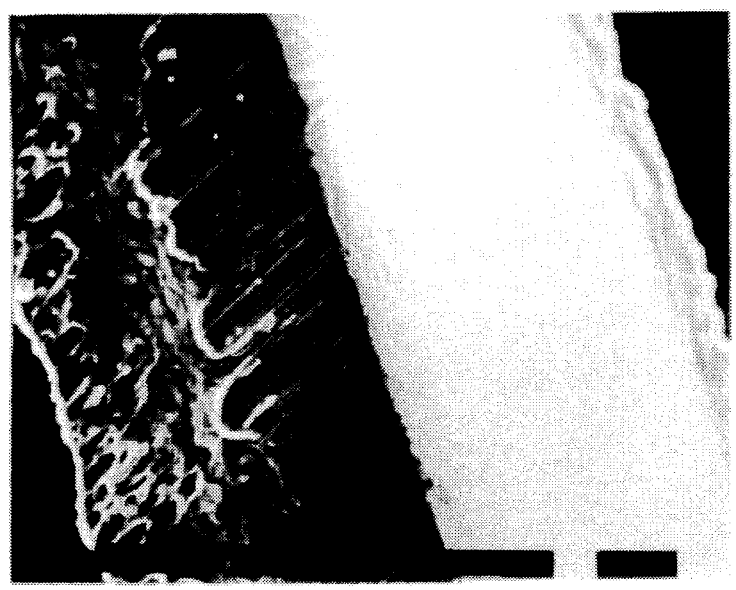
FIGS. 10 to 17 are photographs showing the surface condition of a variety of aluminum alloys both before and after use in an electrochemical cell.
Figure 11:

| Figure | Aluminum Alloy | Exposure | Configuration | Condition |
|---|---|---|---|---|
| FIG. 10 | 1100-0 | none | expanded metal | virgin |
| FIG. 11 | 1100-0 | none | expanded metal | stored at OC for 3 months @ 37° C. |

TABLE 5-continued

Figure 12:
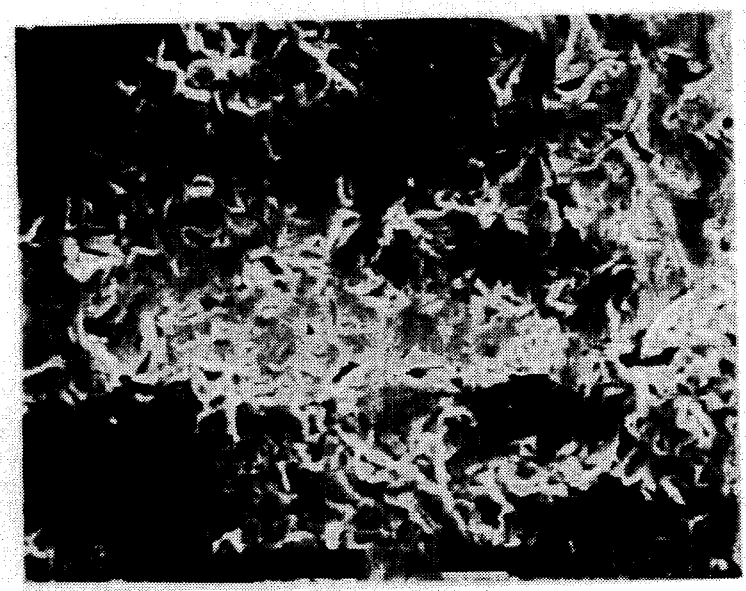
Figure 13:
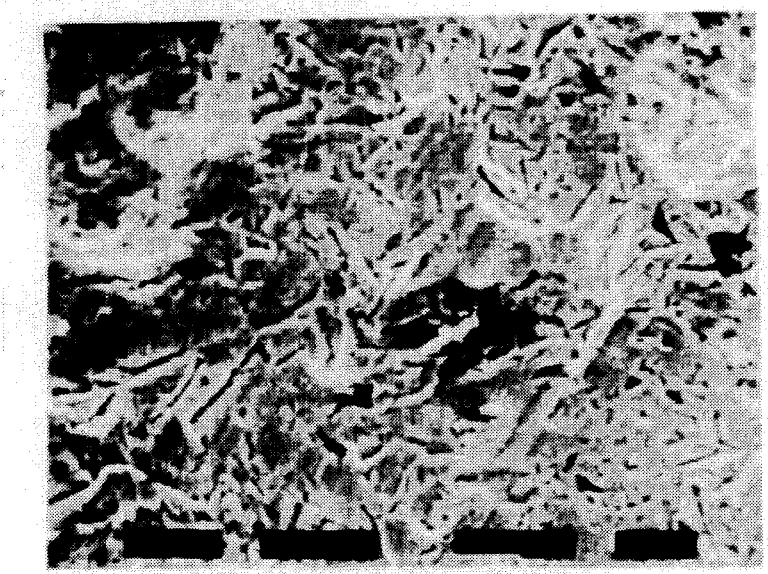
Figure 14:
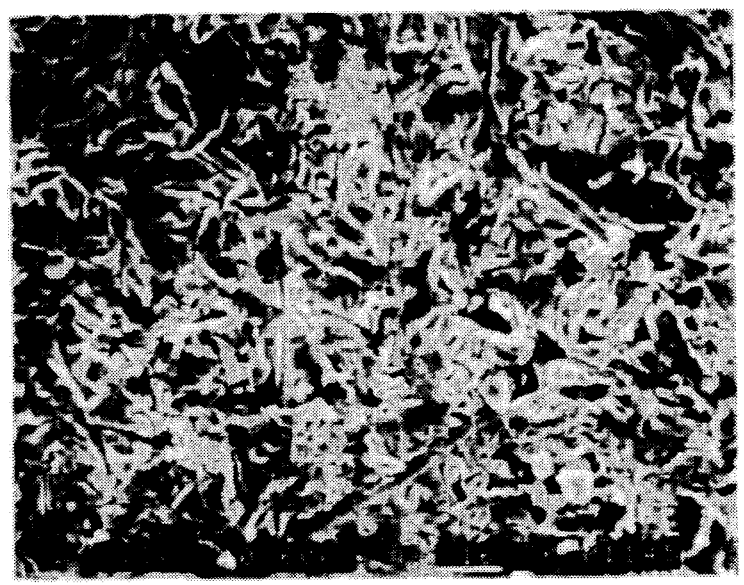
Figure 15:
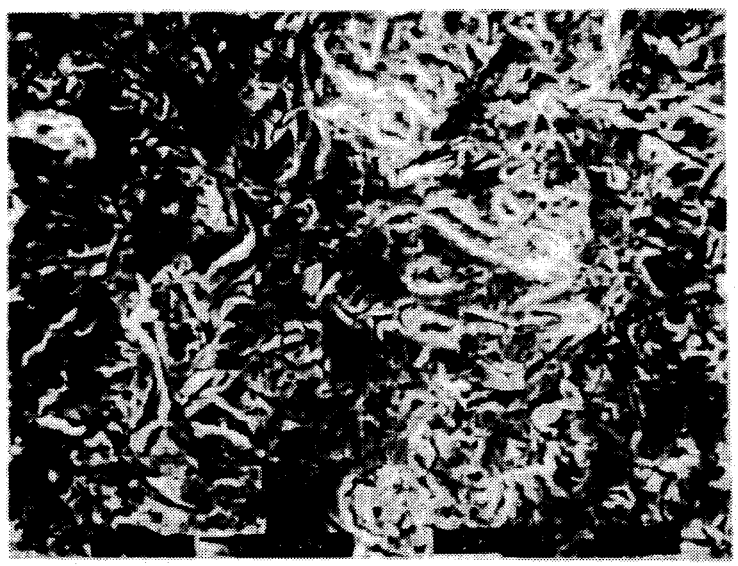
Figure 16:
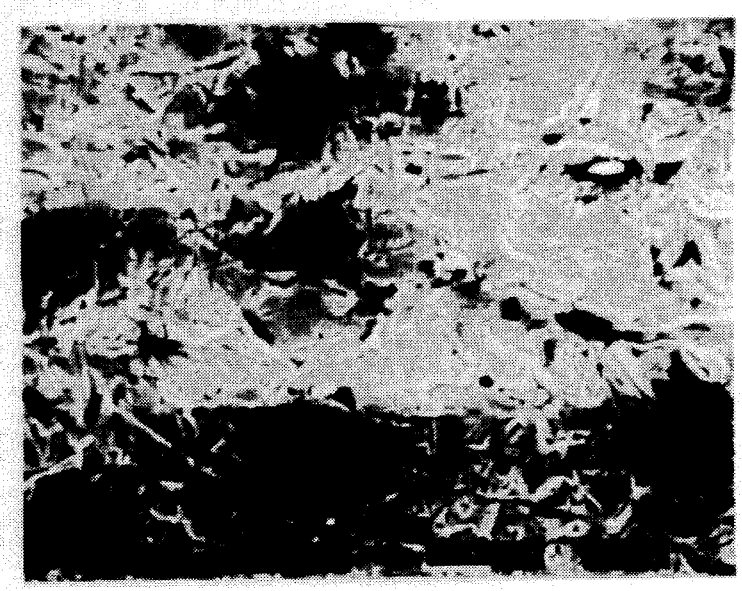
Figure 17:
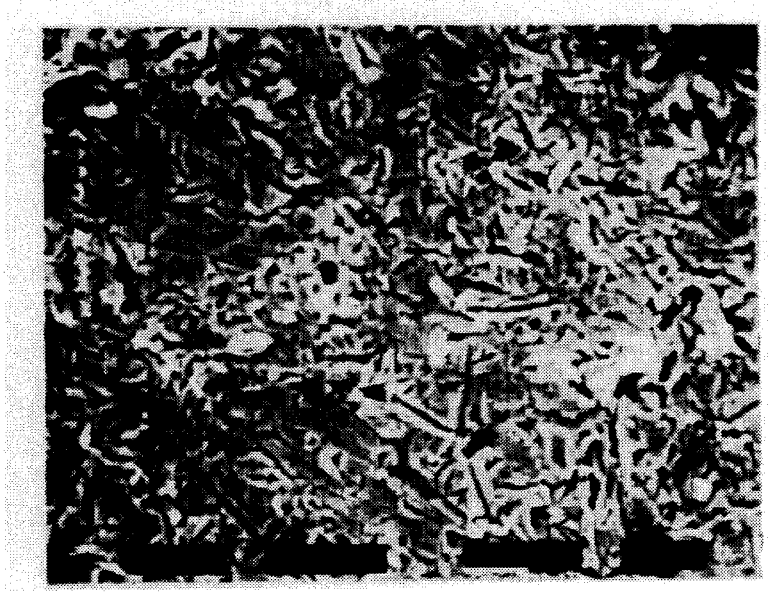

| Figure | Aluminum Alloy | Exposure | Configuration | Condition |
| --- | --- | --- | --- | --- |
| FIG. 12 | 1100-0 | caustic dip | etched screen | virgin |
| FIG. 13 | 1100-0 | caustic dip | etched screen | accelerated discharged, then stored at OC for ~ 3 months @ 37° C. |
| FIG. 14 | 1145-H19 | hydrofluoric acid dip | etched screen | virgin |
| FIG. 15 | 1145-H19 | hydrofluoric acid dip | etched screen | accelerated discharged, then stored at OC for ~ 3 months @ 37° C. |
| FIG. 16 | 5052-H19 | caustic dip | etched screen | virgin |
| FIG. 17 | 5052-H19 | caustic dip | etched screen | accelerated discharged, then stored at 0C for ~ 3 mos. @ 37° C. |

No corrosion was evident in any of the aluminum samples.

Accelerated discharge in this example comprised application of a train of pulses to the respective cells each half hour. Each train consisted of four 1.5 amp pulses of 10 seconds duration with 15 seconds rest between each pulse. Note that each of the photos of an aluminum alloy cathode current collector incorporated into a cell, i.e., FIGS. 10, 12, 14 and 16 are spectacularly reminiscent of the virgin material and that no pitting, evident when corrosion takes place, can be seen in these figures regardless of the several treatments investigated.

Figure 18:
FIG. 18 shows a virgin titanium screen.
Figure 19:
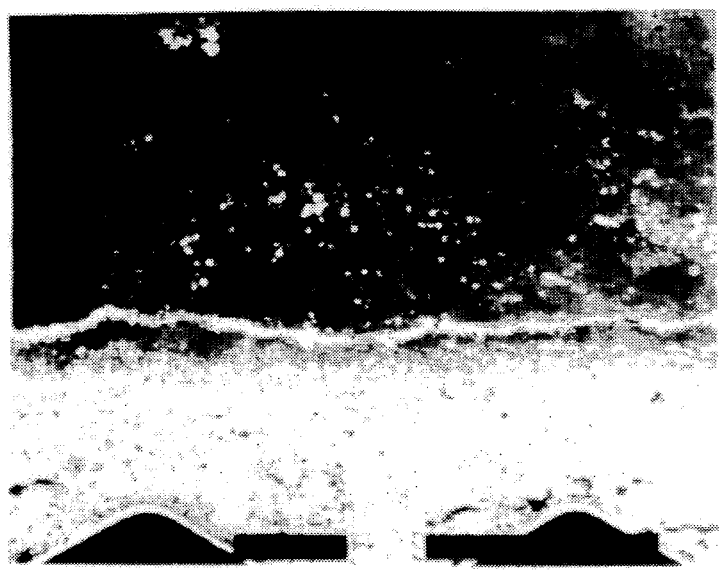
FIGS. 19 to 21 show titanium screens removed from $LiPF_6$ electrolyte cells that were stored at 72° C. for various periods of time prior to discharge.
Figure 20:
Figure 21:
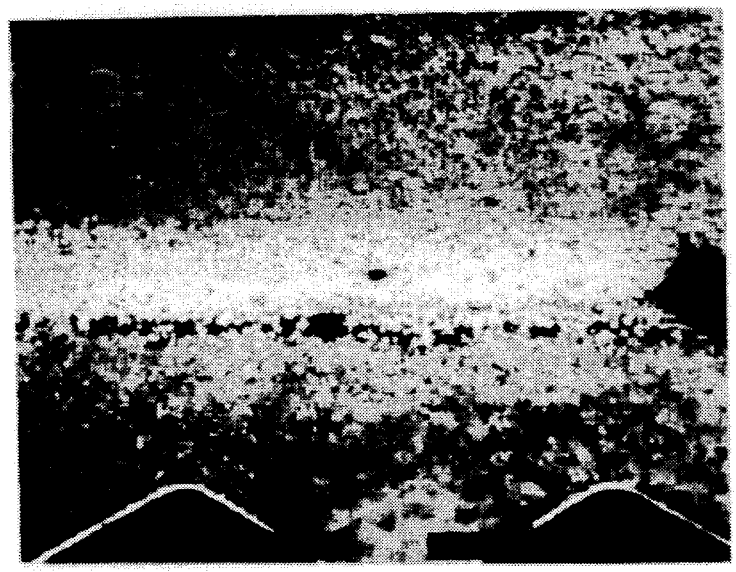

In great contrast to the photographs showing the aluminum alloys, FIGS. 18 to 21 show titanium screens removed from $LiPF_6$ electrolyte cells that were stored at 72° C. for 39, 61 or 29 days, respectively, prior to discharge as described above. FIG. 18 is a photograph of a virgin titanium screen. Note that the photographs in FIGS. 19 to 21 show a line of pits about ½ up in each figure whereas no such pits are seen in FIG. 18, the virgin screen. These pits are evidence of corrosion. No such pitting is found in cells using the $LiAsF_6$ salt electrolyte for either of the above described cathode current collector materials.

EXAMPLE V

Mixed $LiPF_6$/$LiAsF_6$ Salt Cells

Figure 22:
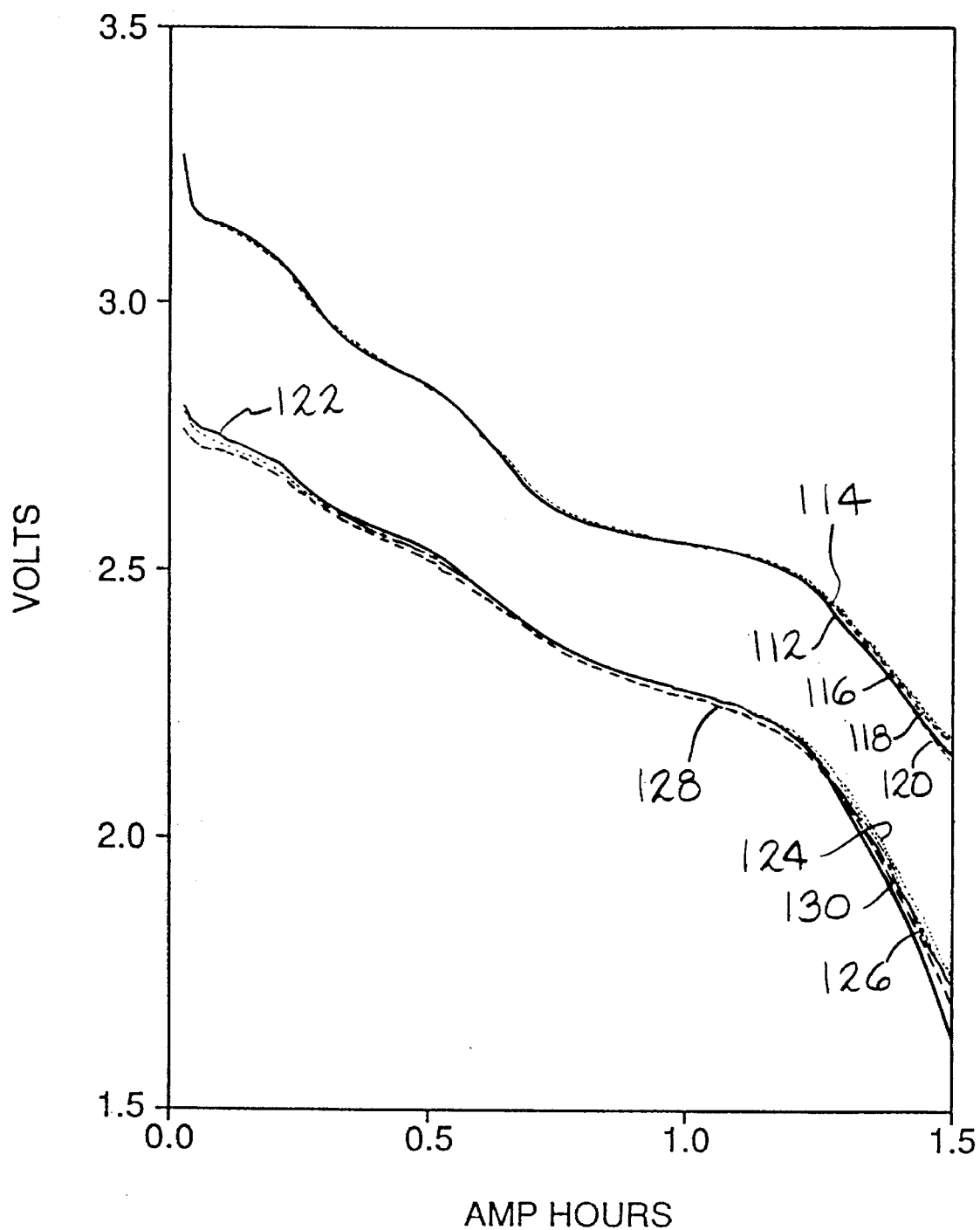
FIGS. 22 and 23 are graphs of the pulse discharge voltage versus amp hours for various cells activated with electrolytic solutions having ratios of $LiAsF_6$ to $LiPF_6$ ranging from 100:0 to 0:100.
Figure 23:
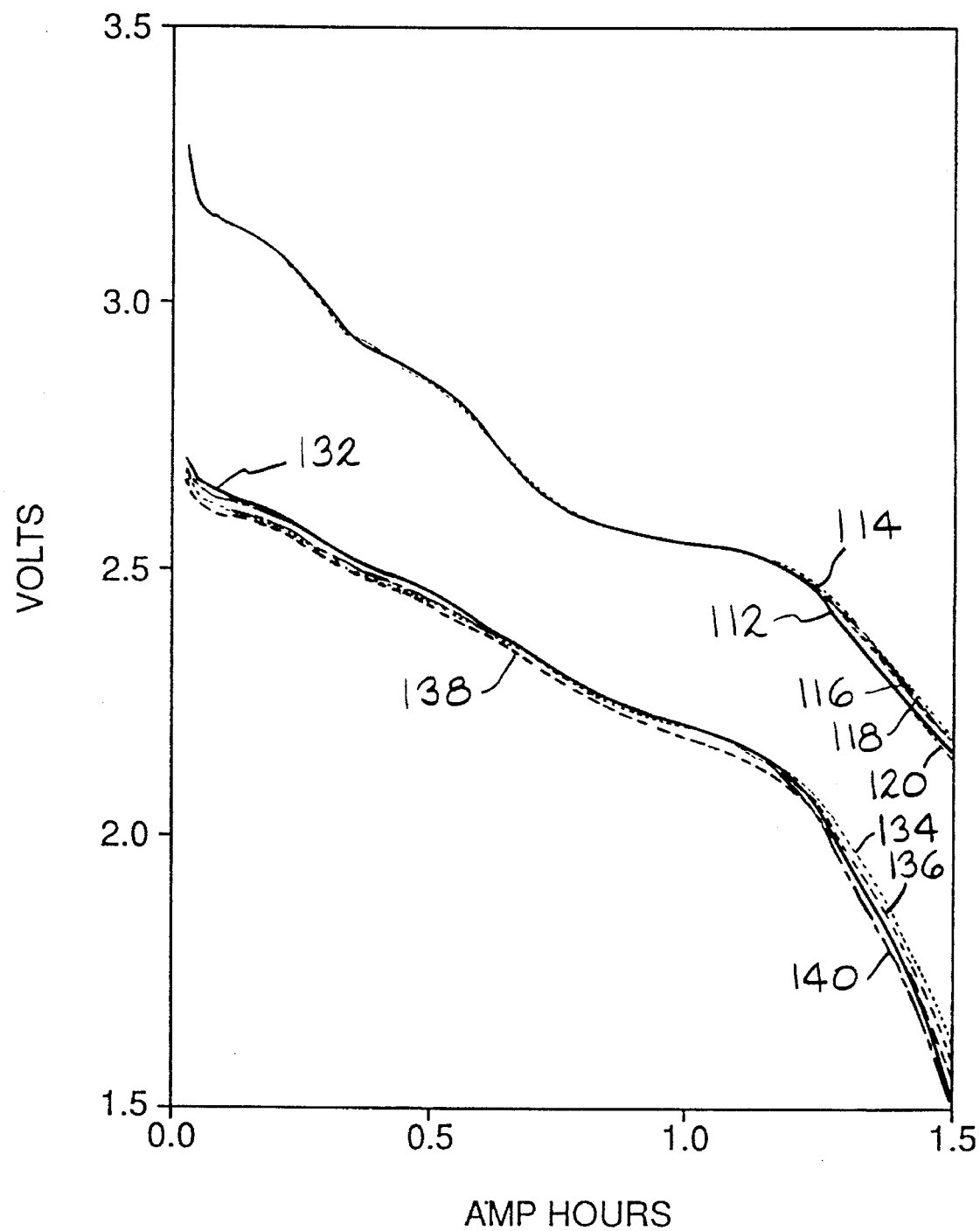

A first group of cells containing mixtures of $LiAsF_6$ and $LiPF_6$ at a combined concentration of 1 mol·L$^{-1}$ in a 1:1 volume mixture of propylene carbonate and dimethoxyethane were used to investigate the accelerated discharge of mixed salt cells. $LiPF_6$/$LiAsF_6$ ratios of 0/100, 25/75, 50/50, 75/25 and 100/0 were used and the cells were discharged through application of a train of pulses each half hour. Each train consisted of four 1.5 amp pulses of 10 second duration with 15 seconds rest between each pulse. The pre-pulse open circuit voltage and first pulse minima (p1 min) for a random selection of cells is presented in FIG. 22, and the pre-pulse open circuit voltage and fourth pulse minima (p4 min) for the same cells is presented in FIG. 23. In FIGS. 22 and 23, curve 112 was constructed from the open circuit voltage (OCV) of a cell constructed according to the present invention and activated with an electrolytic solution having dissolved therein $LiPF_6$ and $LiAsF_6$ in a ratio of 100:0. Similarly, curves 114, 116, 118 and 120 were constructed from the OCV of cells activated with an electrolyte having the enumerated lithium salts in ratios of 75:25, 50:50, 25:75 and 0:100, respectively. In FIG. 22, curve 122 was constructed from the first pulse minima (p1 min) of the cell that was discharged to construct curve 112. Similarly, curves 124, 126, 128 and 130 were constructed from the first pulse minima of the cells that were discharged to construct curves 114, 116, 118 and 120, respectively. In FIG. 23, curve 132 was constructed from the fourth pulse minima (p4 min) of the cell that was discharged to construct curve 112 in FIG. 22. Similarly, curves 134, 136, 138 and 140 were constructed from the fourth pulse minima of the cells that were discharged to construct curves 114, 116, 118 and 120, respectively. Note that although no trend occurs as to decreasing or increasing pulse voltage values within each salt ratio, there are differences with changing ratio.

A second group of cells containing mixtures of $LiAsF_6$ and $LiPF_6$ were discharged under loads of 17.4 KΩ with superimposed pulse trains applied every 60 days. The pulse trains consisted of four 1.5 amp, 10 second pulses with 15 seconds rest between each pulse. This type of discharge is termed in house as one year ADD. Pre-pulse and first pulse voltage minima are plotted versus pulse trains along the abscissa for each salt ratio group in FIG. 24 while the pre-pulse and fourth pulse voltage minima are plotted versus these same pulse trains in FIG. 25.

Figure 24:
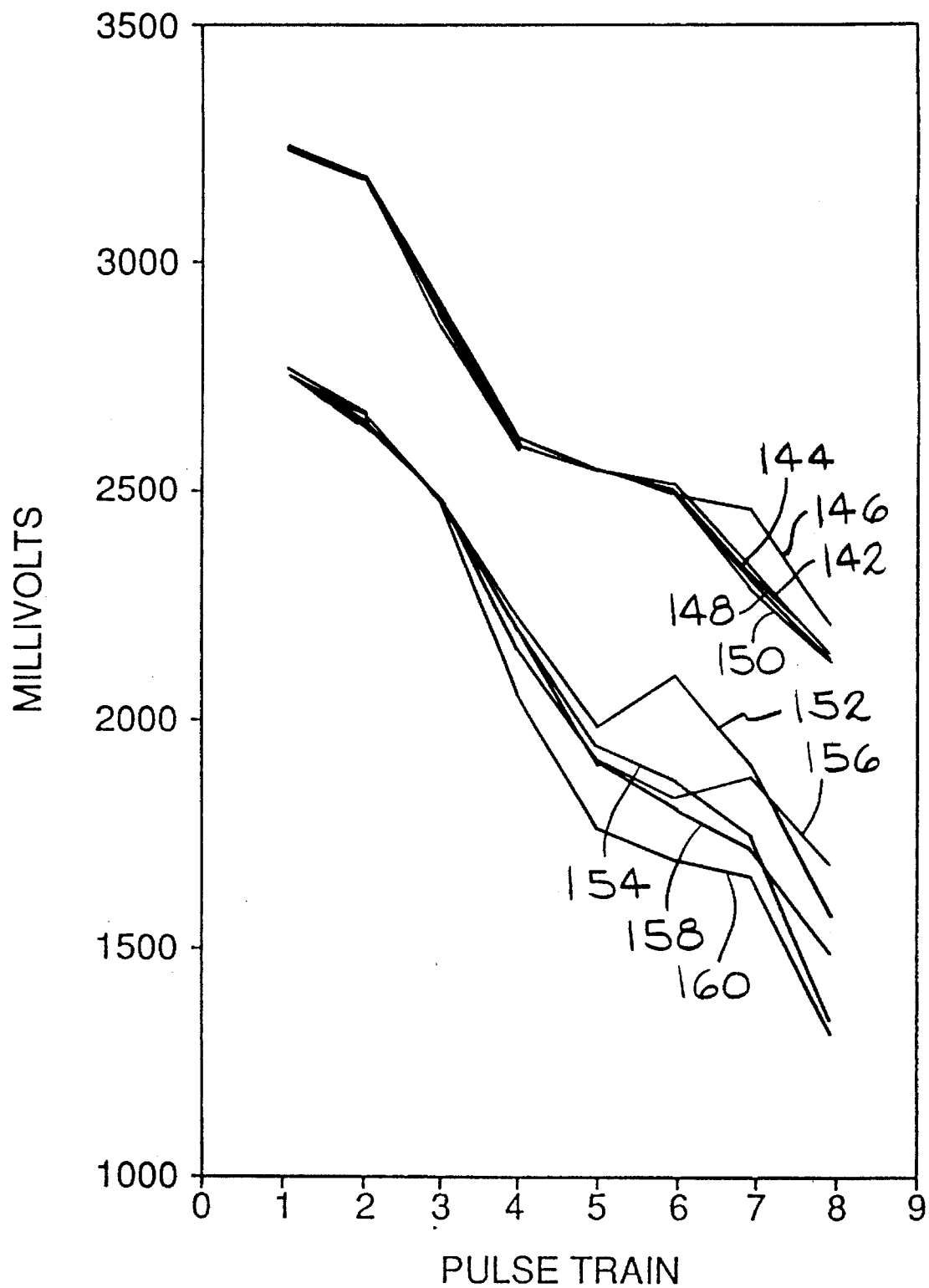
FIGS. 24 and 25 are graphs showing discharge curves versus pulse train for cells activated with different $LiPF_6$/$LiAsF_6$ ratios.
Figure 25:
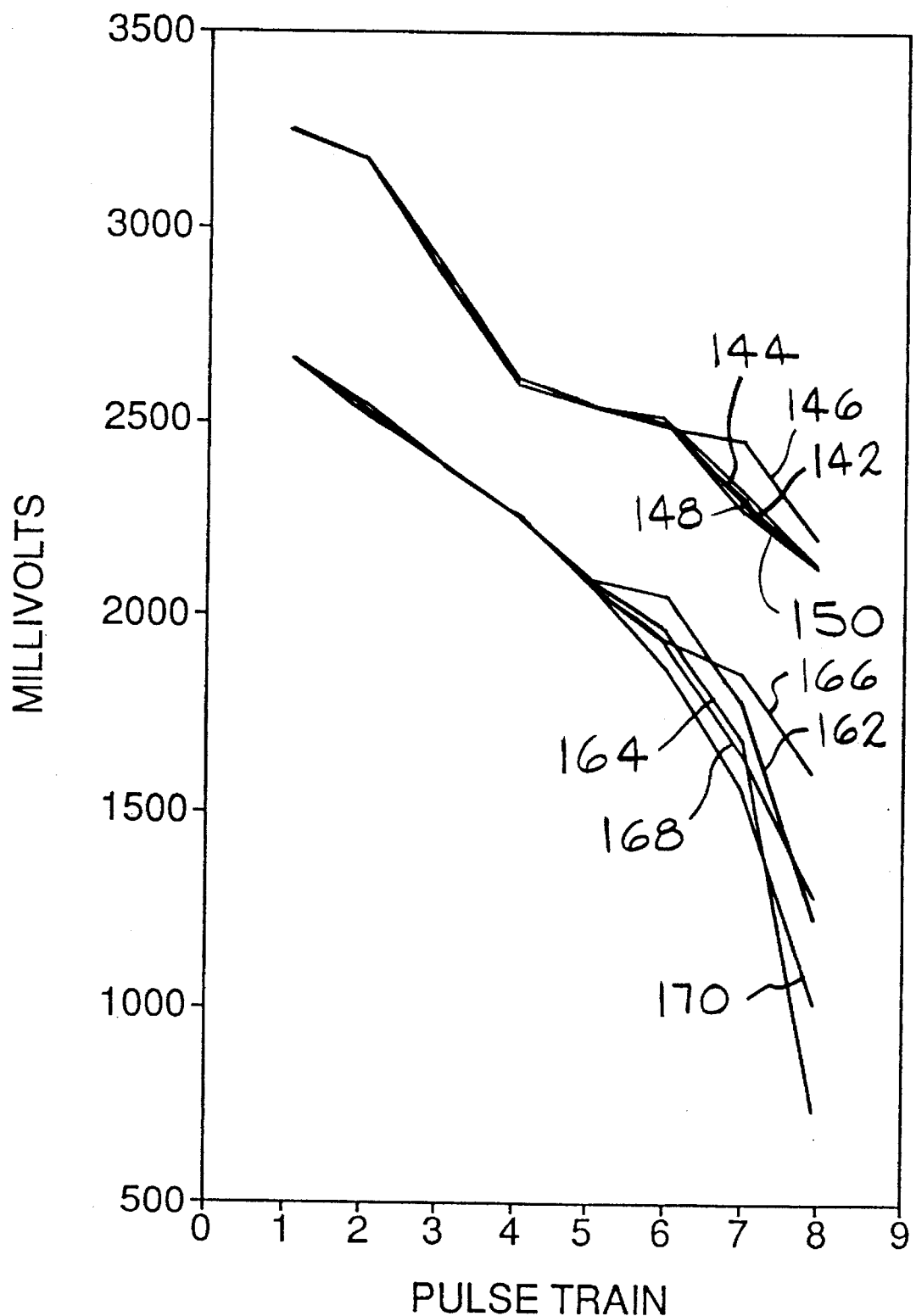

Thus, in FIGS. 24 and 25, curve 142 was constructed from the pre-pulse voltage of a cell activated with an electrolytic solution consisting of $LiPF_6$ and $LiAsF_6$ in a ratio of 100:0 while curves 144, 146, 148 and 150 were constructed from the pre-pulse voltage of cells activated with an electrolytic solution having the enumerated lithium salts dissolved therein in ratio of 75:25, 50:50, 25:75 and 100:0, respectively. In FIG. 24, curve 152 was constructed from the first pulse minima (p1 min) of the cell that was discharged to construct curve 142. Similarly, curves 154, 156, 158 and 160 were constructed from the first pulse minima of the cells that were discharged to construct curves 144, 146, 148 and 150, respectively. In FIG. 25, curve 162 was constructed from the fourth pulse minima (p4 min) of the cell that was discharged to construct curve 142 in FIG. 24. Similarly, curves 164, 166, 168 and 170 were constructed from the fourth pulse minima of the cells that were discharged to construct curves 144, 146, 148 and 150, respectively.

Note how the pulse minima increase for each train as the amount of $LiPF_6$ in the electrolyte increases, especially, in the fourth through seventh pulse trains. It is evident that in general, as the $LiPF_6$/$LiAsF_6$ ratio increases, the first pulse minima increase.

The difference between first pulse minima and the final first pulse voltage immediately prior to the first rest during the pulse train is known as voltage delay. Large voltage delays are undesirable for the intended application of this type of cell, for example in an implantable medical device wherein high currents are needed during device activation.

Thus, it should be realized that the use of higher ratios of $LiPF_6/LiAsF_6$, especially a ratio of 100/0 offers improved voltage delay characteristics.

Figure 26:
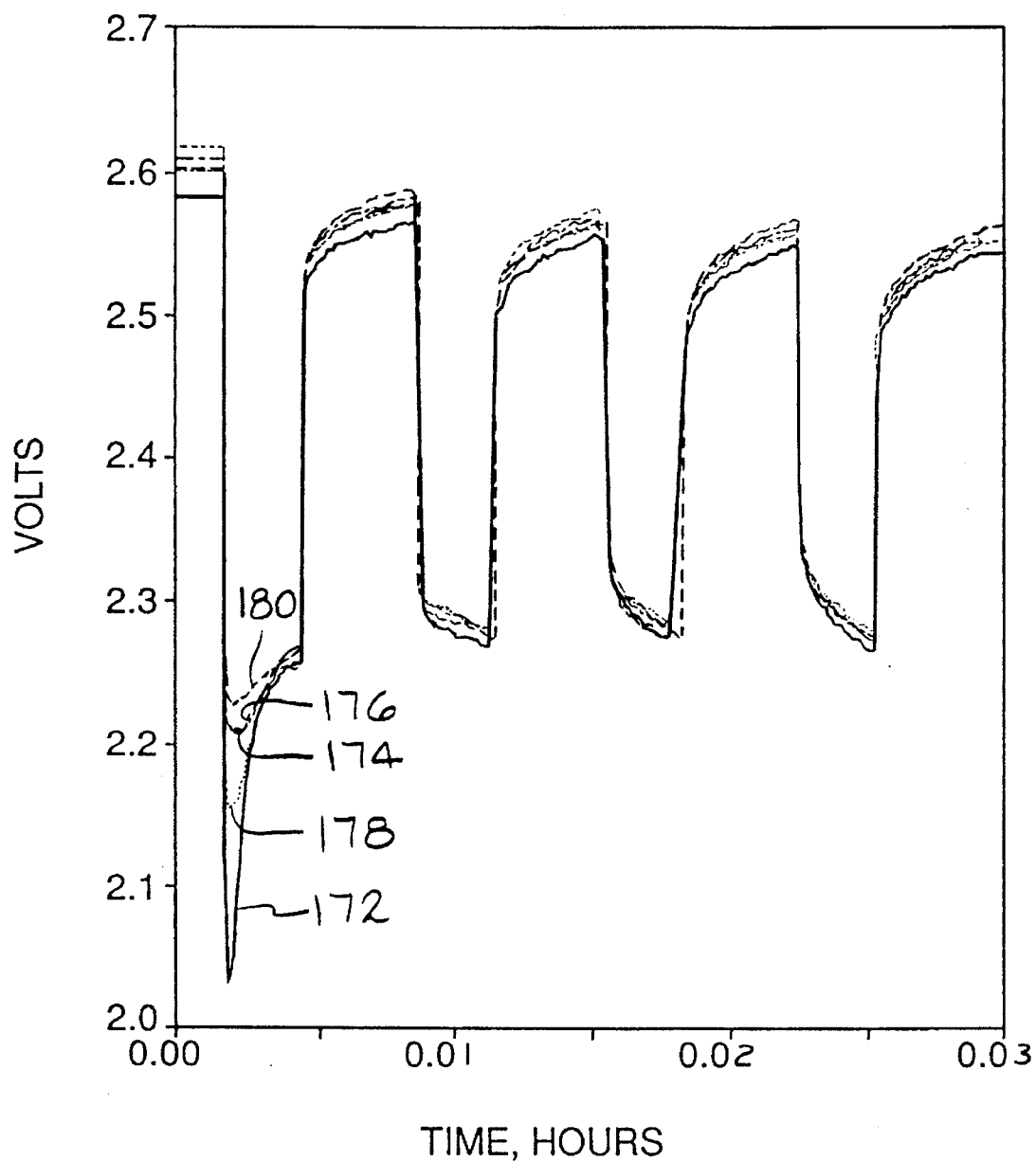
FIGS. 26 to 28 are graphs of pulse of trains versus time for various cells activated with electrolytic solutions having ratios of $LiAsF_6$ to $LiPF_6$ ranging from 100:0 to 0:100.
Figure 27:
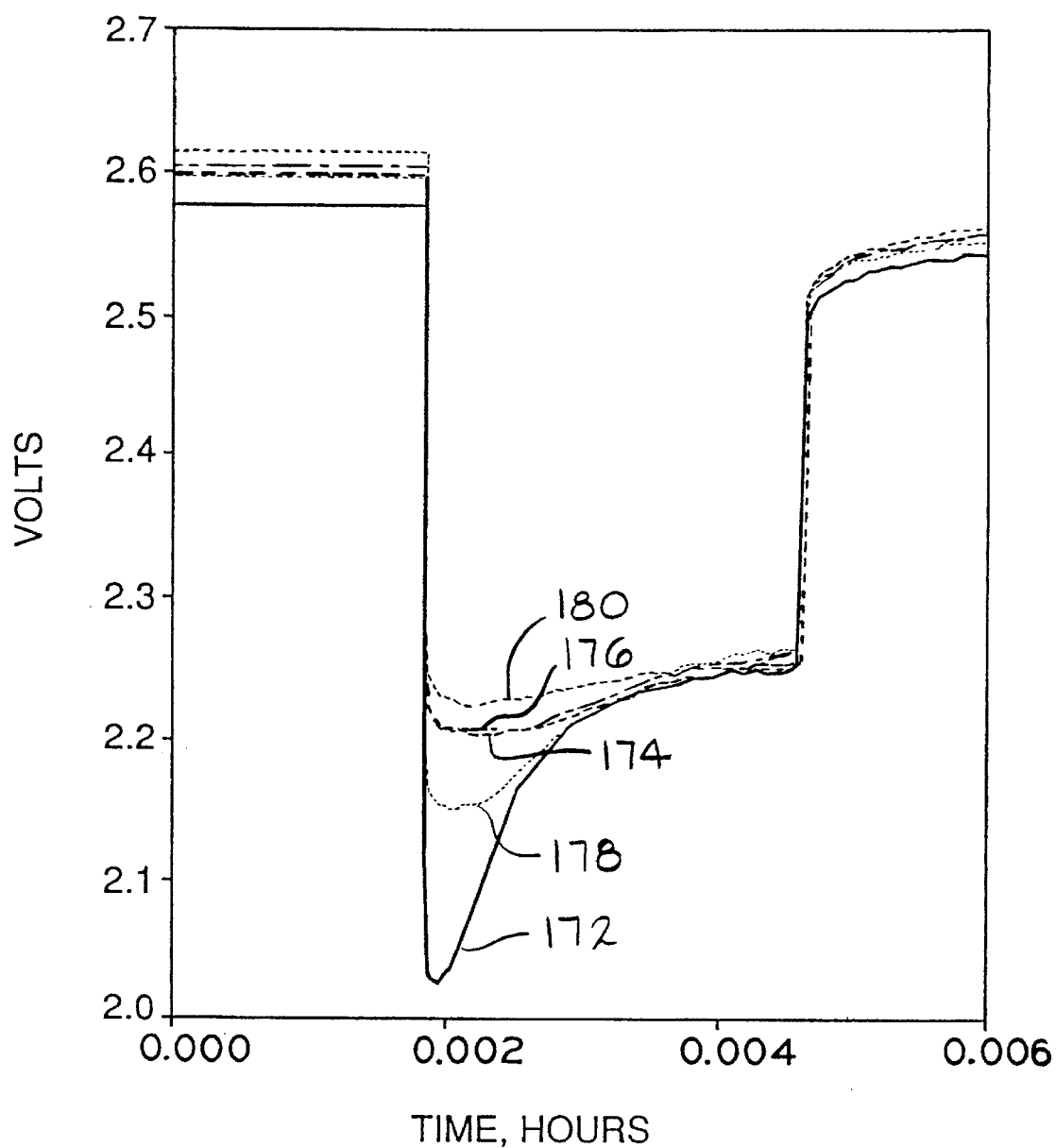

A third group of cells containing mixtures of $LiAsF_6$ and $LiPF_6$ were partially discharged through loads of 5 KΩ before being stored at 50° C. for 2 weeks. The cells were equilibrated to 37° C. prior to application of multiple pulse trains comprising four 1.5 A, 10 second pulses with 15 seconds rest between each pulse. This test emulates the one year ADD and is used to rapidly discharge cells to a depth of discharge where $LiAsF_6$ containing cells have historically shown voltage delay. In FIG. 26, curve 172 was constructed from the fourth pulse train of a cell activated with an electrolytic solution having dissolved therein $LiAsF_6$ and $LiPF_6$ in a ratio of 100:0. Likewise, curves 174, 176, 178 and 180 were constructed from the fourth pulse train of cells activated with an electrolytic solution having the enumerated lithium salts dissolved therein in ratios of 75:25, 50:50, 25:75 and 0:100, respectively. FIG. 27 is an expanded graph of the first pulse of the fourth pulse train graphed in FIG. 26. Similarly, in FIG. 28, curves 182, 184, 186, 188 and 190 were constructed from the fifth pulse train of the cells that were previously discharged to construct curves 172, 174, 176, 178 and 180 in FIGS. 26 and 27, respectively. It is readily apparent that the higher the ratio of $LiPF_6$:$LiAsF_6$, the less effect there is on the voltage delay characteristics of a pulse discharged cell.

Figure 28:
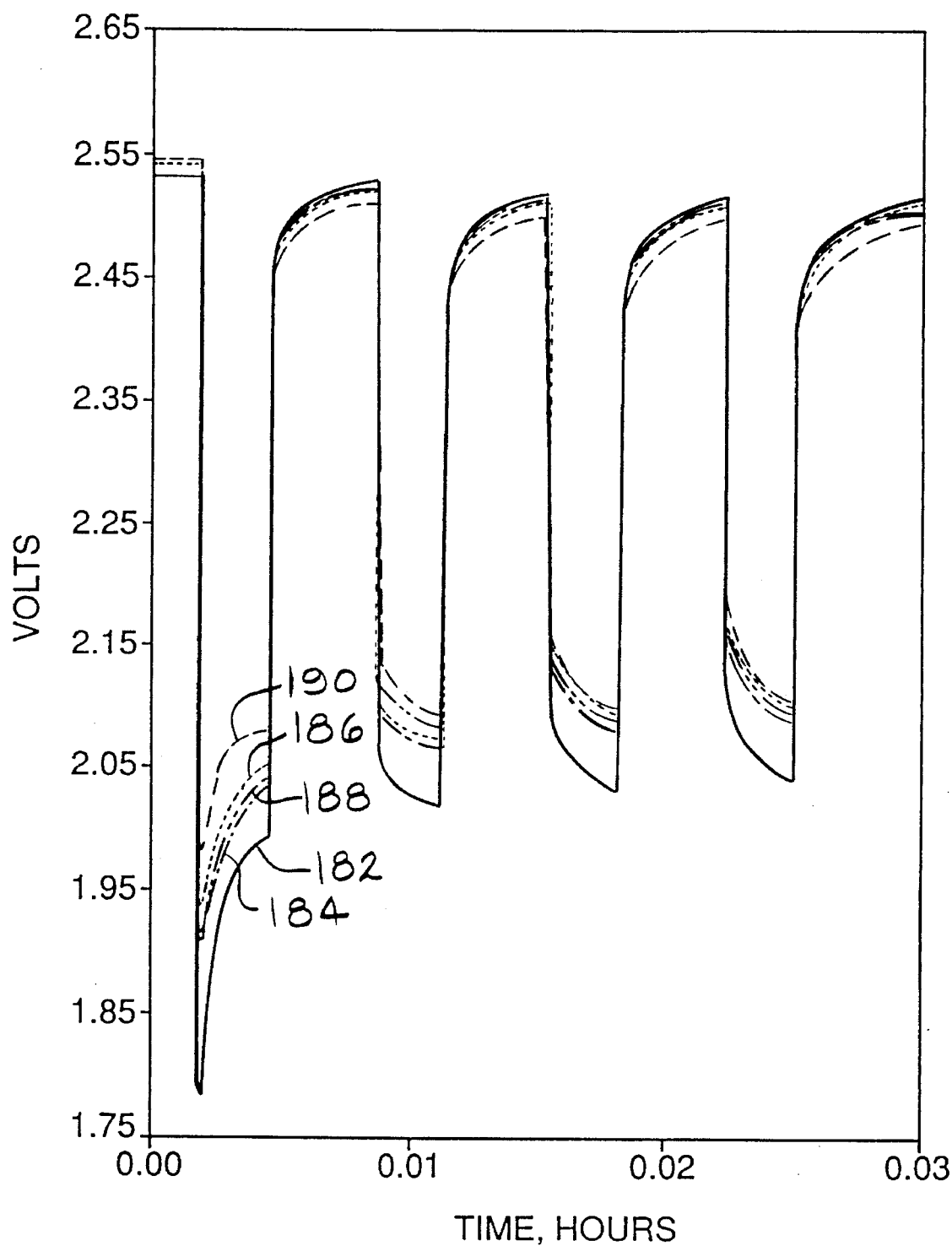
Figure 29:
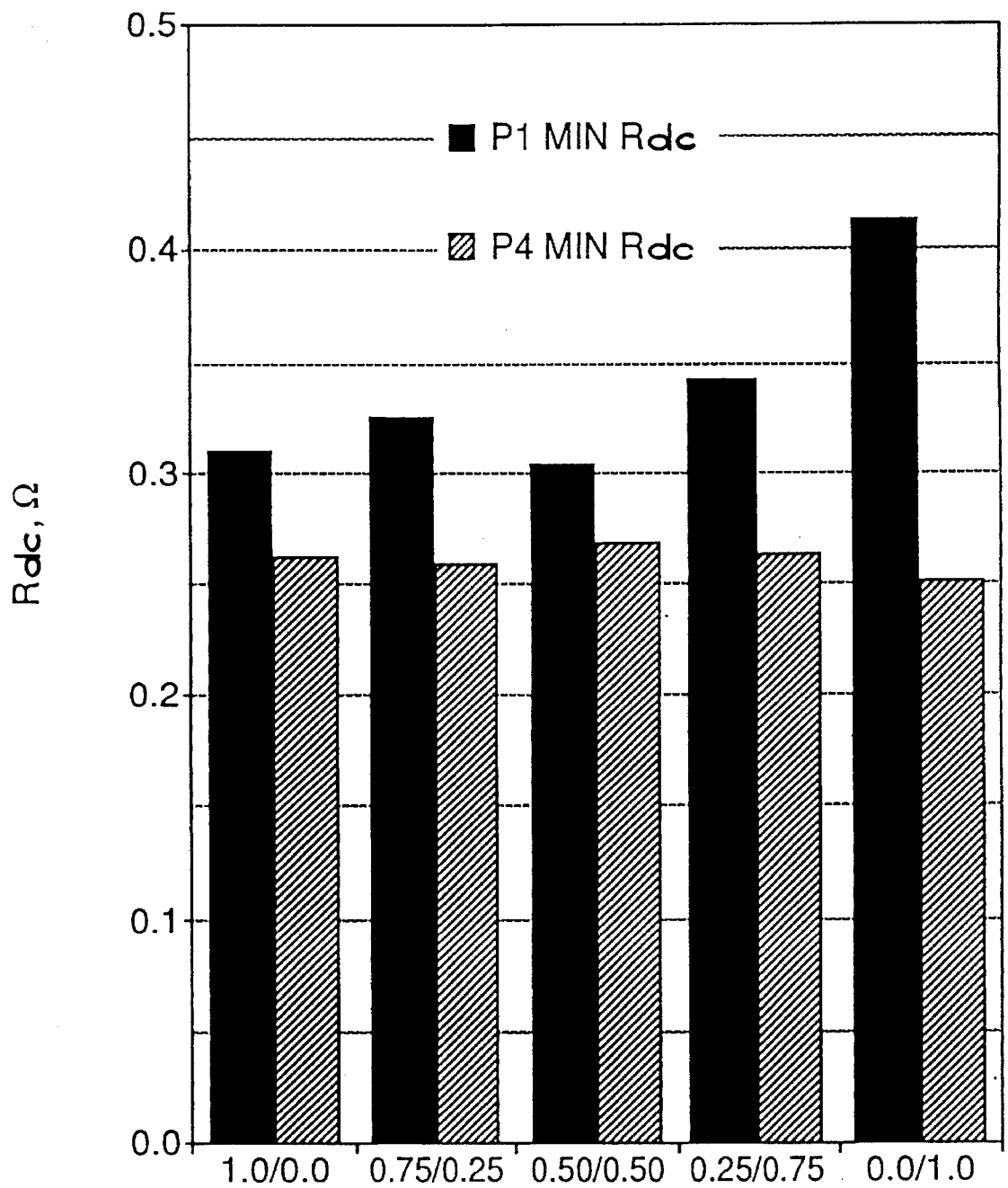
FIG. 29 is a graph of the resistance of various cells activated with electrolytic solutions having ratios of $LiAsF_6$ to $LiPF_6$ ranging from 100:0 to 0:100.

The voltage delay phenomenon is also exemplified in calculations of Rdc, the uncompensated cell resistance, calculated as Rdc=(prepulse voltage–pulse minimum) pulse current amplitude The Rdc for pulses one and four for each electrolyte salt ratio of the cells discharged to construct FIGS. 26 to 28 are shown in FIG. 29 and presented in Table 6. It is apparent that mixing $LiPF_6$ electrolyte salt with $LiAsF_6$ salt drastically affects the Rdc in these cells.

TABLE 6

Comparison of Pulse Minima Rdc, Ω

| $LiPF_6/LiAsF_6$ ratio | P1 Min Rdc | P4 in Rdc |
| --- | --- | --- |
| 100/0 | 0.309 ± 0.013 | 0.261 ± 0.007 |
| 75/25 | 0.324 ± 0.006 | 0.257 ± 0.009 |
| 50/50 | 0.302 ± 0.004 | 0.266 ± 0.010 |
| 25/75 | 0.339 ± 0.027 | 0.262 ± 0.005 |
| 0/100 | 0.411 ± 0.038 | 0.257 ± 0.009 |

EXAMPLE VI

Figure 30:
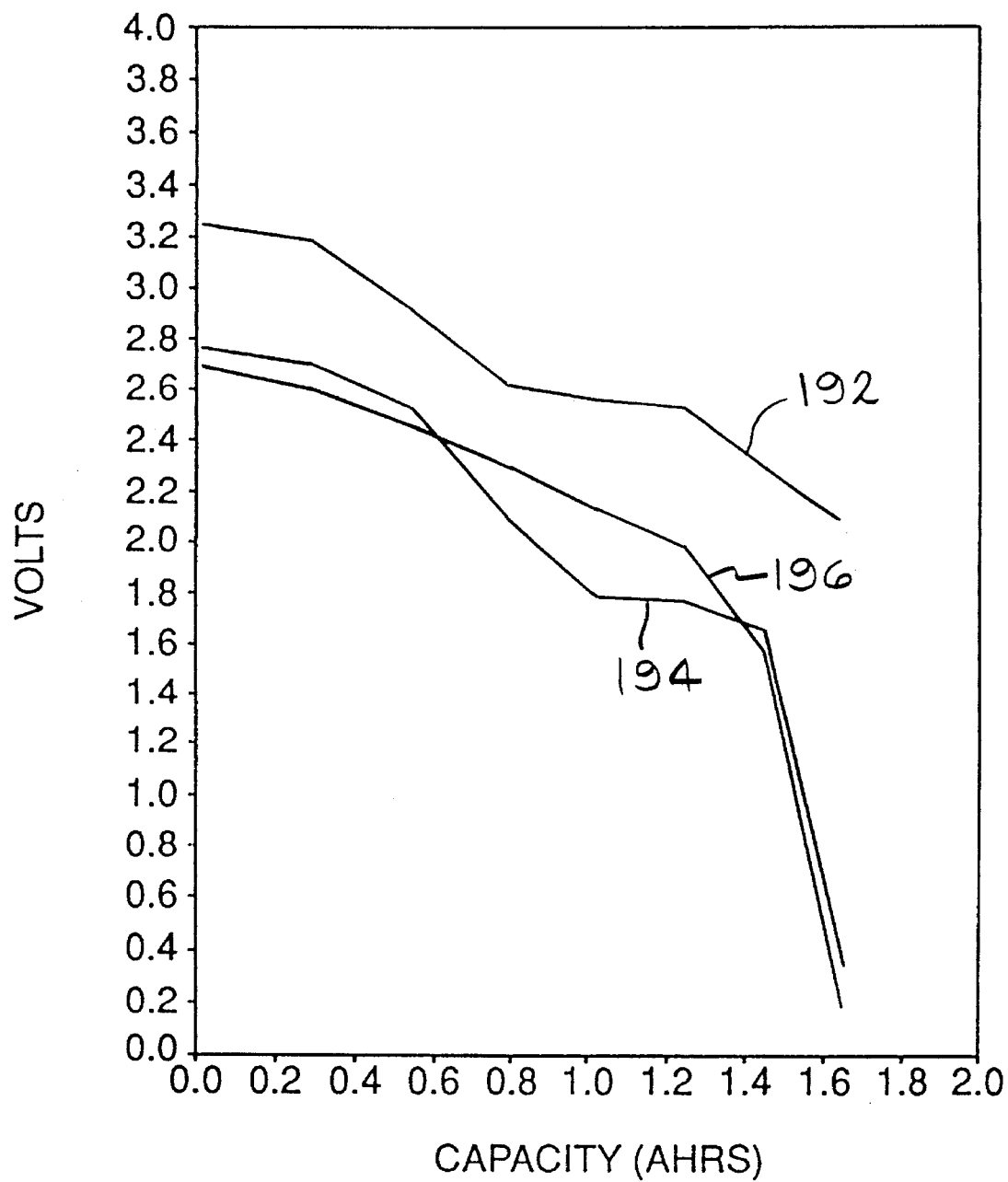
FIGS. 30 and 31 are graphs of the discharge characteristics of cells activated with electrolytic solutions having $LiAsF_6$ and $LiPF_6$ dissolved therein, respectively.
Figure 31:
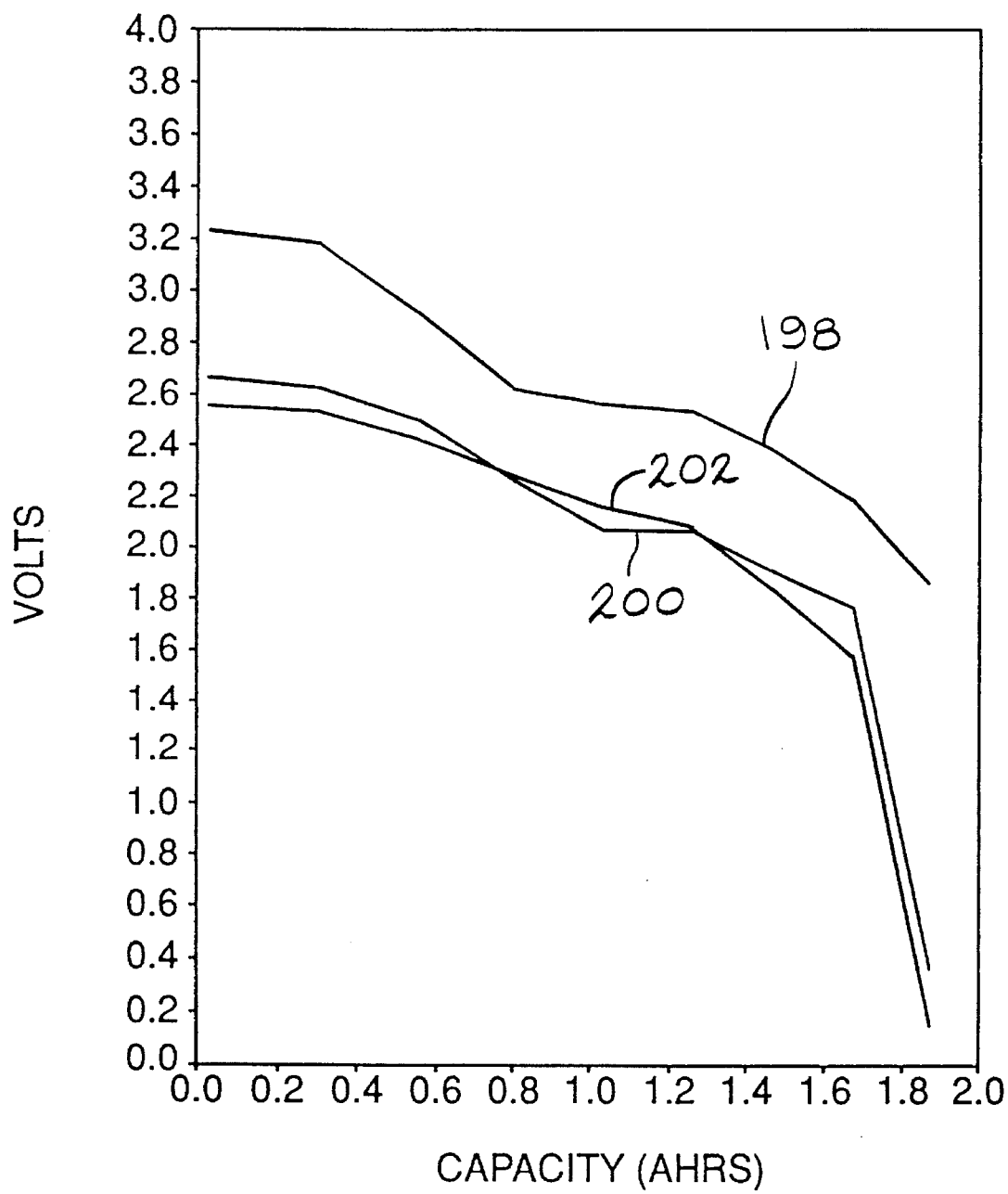

One Year ADD Of Cells Containing Single Electrolyte Salt, $LiPF_6$ Versus $LiAsF_6$ A group of cells containing either $LiAsF_6$ or $LiPF_6$ at a concentration of 1 mol·L$^{-1}$ in a 1:1 volume mixture of dimethoxyethane/propylene carbonate were discharged using loads of 17.4 KΩ. The cells received an application of a pulse train comprising four 1.5 A, 10 second pulses with 15 seconds rest between each pulse. One such pulse train was superimposed on the background load each 2 months. The pulse one and pulse four voltage minima and the pre-pulse voltage are plotted in FIGS. 30 and 31. FIG. 30 shows discharge curves constructed from a representative cell activated with an electrolytic solution having $LiAsF_6$ dissolved therein, wherein curve 192 was constructed from the pre-pulse voltage, curve 194 was constructed from the first pulse minima and curve 196 was constructed from the fourth pulse minima. In contrast, FIG. 31 shows the discharge curves constructed from a representative cell activated with an electrolytic solution having $LiPF_6$ dissolved therein, wherein curve 198 was constructed from the pre-pulse voltage curve, 200 was instructed from the p1 min and curve 202 was constructed from the p4 min.

Note how the $LiPF_6$ containing cells do not exhibit voltage delay to the extent that the $LiAsF_6$ containing cells do, i.e., not as many trains have pulse one minima at voltages lower than pulse four minima. Also note that the voltage minima are not as low in the $LiPF_6$ containing cells as they in the $LiAsF_6$ containing cells in the final four pulse trains of the discharge.

EXAMPLE VII

Heat Dissipation Of Li/SVO Cells Containing $LiPF_6$ Versus $LiAsF_6$

Fourteen experimental cells were built to test the ability of the electrolytic solution of the present invention comprising a lithium hexafluorophosphate ($LiPF_6$) salt to dissipate heat upon discharge of the cell. In particular, the electrolytic solution comprised 1M $LiPF_6$ dissolved in a 50/50 mixture (by volume) of dimethoxyethane and propylene carbonate. The electrolytic solution was used to activate a lithium/silver vanadium oxide cell system similar to that previously described with respect to the prior art construction and having a 1.8 Ah capacity. Two cells were submitted for short circuit testing, three cells were monitored for open circuit voltage (OCV) and heat dissipation, six cells were subjected to accelerated pulse discharge testing and three cells were discharged under the one year accelerated discharge data (ADD) regime.

The results from the two cells subjected to short circuit testing compared similarly with results from standard electrolyte cells, i.e., Li/SVO cells activated with an electrolyte solution comprising $LiAsF_6$.

The heat dissipation from the three cells monitored for open circuit voltage testing ranged from about 27.0 μWatts to about 30.0 μWatts at one month of age and continually declined to between about 4.6 μWatts and about 10.2 μWatts at about 14 months of age.

Under accelerated pulse discharge testing, the six cells delivered an average of about 1.34±0.03 Ah to 2 Volts(V), 1.52±0.01 Ah to 1.7 V and 1.60±0.01 Ah to 1.5 V, respectively. These means are greater than means for Li/SVO cells activated with the $LiAsF_6$ electrolytic solution, discharged under the same regime.

Figure 32:
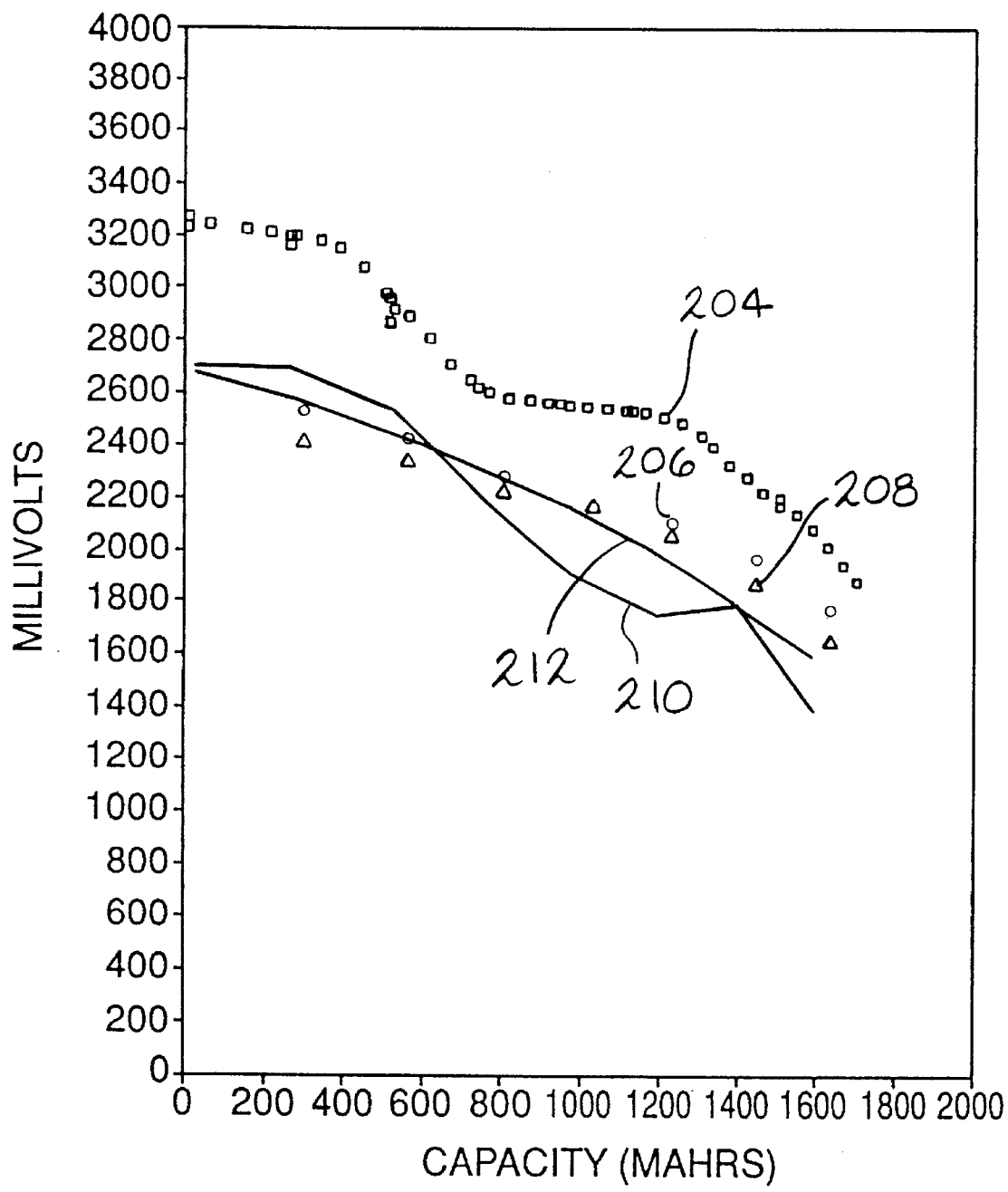
FIG. 32 is a graph showing the average discharge curves of a plurality of lithium/silver vanadium oxide (Li/SVO) electrochemical cells activated by a solution according to the present invention comprising 1M $LiPF_6$ dissolved in a 50/50 mixture (by volume) of DME/PC and subjected to the one year accelerated discharge data (ADD) regime. Comparative discharge curves are also shown for similarly built Li/SVO prior art cells activated with an electrolyte comprising a one molar solution of lithium hexafluoroarsenate (1M $LiAsF_6$) dissolved in a 50/50 by volume mixture of DME/PC and subjected to the one year ADD regime.

The average discharge curves for the three cells in this example subjected to the one year accelerated discharge data (ADD) regime are presented in FIG. 32. The discharge curves were recorded by applying pulse trains consisting of four ten second, 1.5 ampere pulses, every 15 seconds, repeated every 60 days to the respective cells wherein in FIG. 32, curve 204 was recorded prior to pulsing, curve 206 was constructed from the minima of the first pulse of each train and curve 208 was constructed from the minima of the fourth pulse of each train. These curves are presented in comparison to historic data gathered from a plurality of prior art Li/SVO cells activated with an electrolytic solution comprising $LiAsF_6$ dissolved in a 50/50 mixture (by volume) of DME/PC. In particular, curve 210 was constructed from the minima of the first pulse of each pulse train applied to the plurality of prior art cells and curve 212 was constructed from the fourth pulse minima of each pulse train applied to the prior art cells.

As is evident in FIG. 32, the cells behaved slightly different than the standard Li/SVO cells containing LiAsF$_6$ electrolyte. The pulse minima from the present cells were slightly lower at beginning of life (BOL), however, note the improvement in delivered capacity particularly in the region between about 800 mAh to 1600 mAh for the cells of the present invention over the prior art cells. Voltage delay is present for the standard cells with LiAsF$_6$ during the fourth pulse train, but there is no evidence of voltage delay during the fourth pulse train in the LiPF$_6$ cells of the present invention. More importantly, the cells made according to the present invention showed no voltage delay during the middle of life pulse trains.

EXAMPLE VIII

Comparison Of Discharge Of Li/SVO Cells Containing LiPF$_6$ Versus LiAsF$_6$

Fourteen lithium/silver vanadium oxide cells, similar to those cells used in Example VII, were built having a 1.8 Ah capacity. Four of the cells in this example were control cells and contained a prior art electrolyte solution comprising lithium hexafluoroarsenate (LiAsF$_6$) salt. In particular, the electrolytic solution for the four control cells comprised 1M LiAsF$_6$ salt dissolved in a 50/50 mixture (by volume) of dimethoxyethane and propylene carbonate. The remaining cells in this example contained an electrolytic solution according to the present invention and in particular 1M LiPF$_6$ dissolved in a 50/50 mixture (by volume) of dimethoxyethane and propylene carbonate. Five of these remaining cells each were subjected to OCV/heat dissipation and accelerated pulse discharge testing.

Five cells in this build having the LiPF$_6$ electrolytic solution of the present invention were predischarged under a 3.57 kOhm load and one pulse train was applied one week after removal of the load. Table 7 compares the performance of the subject cells to data for the cells of the same configuration having a standard electrolyte salt comprising lithium hexafluoroarsenate.

TABLE 7

|  | Last load volts | Pre-pulse OCV | P1 min | P4 min |
|---|---|---|---|---|
| LiPF$_6$ mean | 3.187 ± 0.004 | 3.274 ± 0.003 | 2.37 ± 0.075 | 2.579 ± 0.045 |
| Control LiAsF$_6$ | 3.167 | 3.244 | 2.307 | 2.576 |

As is evident in Table 7, the means exceed the minimum criteria set for all categories.

After having been predischarged under a 3.57 KΩ load, the five cells in this example were monitored for open circuit voltage. This was done to test for heat dissipation which ranged from about 18.5 μWatts to about 23.02 μWatts at one month of age compared to about 43.0 μWatts dissipated by the cell having the LiAsF$_6$ electrolyte solution.

The five cells in this build having the LiPF$_6$ electrolytic solution of the present invention and subjected to the accelerated pulse discharged testing, delivered an average of about 1.34±0.01 Ah to 2 V, 1.50±0.01 Ah to 1.7 V and 1.56±0.01 Ah to 1.5 V. The control cells delivered an average of about 1.35 Ah, 1.50 Ah and 1.55 Ah to the respective cutoffs.

From Examples VII and VIII, it can be concluded that lithium/silver vanadium oxide electrochemical cells using LiPF$_6$ as an electrolyte salt are comparable in performance to production standards set for similar cell systems using LiAsF$_6$ as an electrolyte salt. In addition, the use of LiPF$_6$ salt appears to greatly reduce or even eliminate the phenomenon of voltage delay. The cell heat dissipation is also significantly reduced.

EXAMPLE IX

Reactivity Of LiPF$_6$ Versus LiAsF$_6$ In Li/SVO Cells

Twelve experimental lithium/silver vanadium oxide cells similar to those described in Examples VII and VIII were built to test the lithium/electrolyte salt reactivity of the electrolytic solution of the present invention comprising the lithium hexafluorophosphate salt (LiPF$_6$) in comparison to electrolyte salts comprising lithium hexafluoroarsenate (LiAsF$_6$) and lithium perchlorate (LiClO$_4$). Six of the twelve cells contained a standard amount of anode active material comprising an average of about 0.542 grams (g.) of lithium while the remaining six cells contained 60% of the standard amount of anode active material comprising an average of about 0.327 g. of lithium. Each set of six cells was divided into thirds and filled with a 50/50 mixture (by volume) of PC/DME electrolyte that contained either a 1M concentration of LiAsF$_6$, LiClO$_4$ or LiPF$_6$. The 1M LiAsF$_6$ PC/DME electrolyte was prepared in-house, the 1M LiClO$_4$ PC/DME electrolyte was used "as received" from Tomiyama Pure Chemical Industries, Ltd., and the 1M LiPF$_6$ PC/DME electrolyte was prepared in-house. The LiClO$_4$ and LiPF$_6$ electrolytes contained less than 10 ppm H$_2$O by Karl Fischer Titration.

The twelve test cells in this example were then burned-in for 21 hours under a 3.57 KΩ load, and acceptance pulse tested one week after burn-in with one 1.5 Amp pulse train consisting of four 10 second pulses with 15 seconds rest between each pulse. Heat dissipation was recorded after both burn-in and acceptance pulse testing.

The LiPF$_6$ cells had the highest burn-in voltages and the LiClO$_4$ cells had the lowest. The standard lithium and 60% lithium cells had comparable burn-in voltages within each electrolyte group. The LiPF$_6$, LiAsF$_6$ and LiClO$_4$ cells had average preload voltages of about 3731±2 mV, 3705±4 mV and 3602±15 mV, respectively. The average last load voltages of the LiPF$_6$, LiAsF$_6$ and LiClO$_4$ cells were about 3218±1 mV, 3210±1 mV and 3202±1 mV, respectively.

Serial number, electrolyte salt type, anode blank weight (g.), pre-load, first load, last load and post load burn-in voltages, and pre-pulse, pulse 1 minimum, pulse 1 end, pulse 4 minimum and pulse 1 end minus pulse 1 minimum acceptance pulse voltages are presented in Table 8.

TABLE 8

| Cell Serial Number | Anode | | Burn-In 3.57K for 21 hrs | | | Acceptance Pulse 1.5 Amp Pulse Train | | | | |
|---|---|---|---|---|---|---|---|---|---|---|
| | Salt Type | Blank Weight(g) | Pre-Load Voltage | First Load Voltage | Last Load Voltage | Post Load Voltage | Pre-Pulse Voltage | P1 Min Voltage | P1 End Voltage | P4 Min Voltage | P1 End- P1 Min |
| 76956 | LiAsF$_6$ | 0.542 g | 3700 | 3698 | 3207 | 3209 | 3276 | 2422 | 2646 | 2629 | 224 |
| 76957 | LiAsF$_6$ | 0.542 g | 3707 | 3705 | 3209 | 3210 | 3274 | 2434 | 2661 | 2646 | 227 |
| 76966 | LiAsF$_6$ | 0.328 g | 3705 | 3702 | 3209 | 3210 | 3274 | 2483 | 2700 | 2671 | 217 |
| 76967 | LiAsF$_6$ | 0.327 g | 3708 | 3705 | 3209 | 3210 | 3274 | 2444 | 2683 | 2664 | 239 |
| 76960 | LiClO$_4$ | 0.542 g | 3611 | 3609 | 3200 | 3202 | 3267 | 2534 | 2703 | 2673 | 169 |
| 76961 | LiClO$_4$ | 0.542 g | 3618 | 3615 | 3202 | 3203 | 3269 | 2573 | 2695 | 2668 | 122 |
| 76968 | LiClO$_4$ | 0.329 g | 3589 | 3586 | 3201 | 3202 | 3264 | 2605 | 2690 | 2666 | 85 |
| 76969 | LiClO$_4$ | 0.330 g | 3590 | 3588 | 3201 | 3202 | 3264 | 2607 | 2693 | 2668 | 86 |
| 76964 | LiPF$_6$ | 0.541 g | 3729 | 3726 | 3216 | 3218 | 3284 | 2305 | 2651 | 2637 | 346 |
| 76965 | LiPF$_6$ | 0.541 g | 3728 | 3724 | 3215 | 3217 | 3284 | 2317 | 2666 | 2649 | 349 |
| 76970 | LiPF$_6$ | 0.324 g | 3732 | 3727 | 3216 | 3219 | 1286 | 2173 | 2629 | 2603 | 456 |
| 76971 | LiPF$_6$ | 0.324 g | 3733 | 3728 | 3215 | 3218 | 3286 | 2180 | 2642 | 2620 | 462 |

ELECTROLYTE: All salts were dissolved in 50/50 v/o PC/DME in 1M concentration.

EXAMPLE X

Comparison Of Accelerated Pulse Testing Of LiPF$_6$ Verses LiAsF$_6$ In Li/SVO Cells After acceptance pulse testing, the six standard lithium cells used in Example IX were subjected to accelerated pulse testing. Accelerated pulse testing comprised a plurality of 1.5 Amp pulse trains, in particular 68 to 72 such pulse trains, each train applied every 30 minutes and consisting of four 10 second duration pulses with 15 seconds rest between each pulse. This corresponds to between about 1133 mAhrs to 1200 mAhrs of delivered capacity. Heat dissipation was recorded before and after accelerated pulse testing. The six 60% lithium cells used in Example IX were also subjected to accelerated pulse testing comprising between 68 to 70 pulse trains similar to those to which the standard lithium cells were subjected, i.e., 1.5 Amp pulse trains, consisting of four 10 second pulses with 15 seconds rest between each pulse. These cells delivered between about 766 mAhrs and 814 mAhrs of capacity to a 1.5 V cut-off.

Table 9 shows the serial number, salt type, anode blank weight (g.), heat dissipation (μWatts) after burn-in (B-I) and acceptance pulse testing, the number of pulse trains applied and capacity (mAhrs) delivered to 2.0 Volts(V), 1.7 V and 1.5 V during accelerated pulse testing, heat dissipation (μWatts) after accelerated pulse testing, the capacity (mAhrs) removed during 1 KΩ discharge, heat dissipation (μWatts) after 1 KΩ discharge and end of life (EOL) thickness in inches (in.) for each cell tested.

Both the standard and 60% lithium LiAsF$_6$, LiClO$_4$ and LiPF$_6$ cells dissipated an average of about 35.04 μWatts, 52.30 μWatts and 17.87 μWatts respectively, of heat after burn-in and acceptance pulse testing. This results in a statistically significant difference in the heat dissipated between the electrolyte salt groups at a confidence of >99.9%. Additionally, both the standard and 60% lithium LiAsF$_6$, LiClO$_4$ and LiPF$_6$ cells dissipated about 27.63 μWatts, 35.21 μWatts and 19.37 μWatts of heat respectively, after accelerated pulse testing. There thus exists a statistically significant difference in the heat dissipated after accelerated pulse testing between the electrolyte salt groups at a confidence >97.5%. Typically, statistically significant differences are not found to exist between lithium groups within each electrolyte salt set. Thus, the lithium hexafluorophosphate salt clearly exhibits superior heat dissipation characteristics with respect to the other tested electrolyte salts (i.e., low reactivity with the lithium anode) after burn-in and acceptance pulse testing and accelerated pulse testing.

TABLE 9

| Cell Serial Number | Salt Type | Anode Blank Weight (g) | μ Watts After B-I & Acc. Pulse | Number of Pulse Trains | Accelerated Pulse Testing Capacity mAhrs to | | | μ Watts After Accel. Pulse | 1K Load Discharge Capacity (mAhrs) | μ Watts After 1K Load Discharge | EOL Thickness |
|---|---|---|---|---|---|---|---|---|---|---|---|
| | | | | | 2.0 V | 1.7 V | 1.5 V | | | | |
| 76956 | LiAsF$_6$ | 0.542 g | 34.81 | 70 | 1167* | 1167* | 1167* | 31.30 | 180 | 41.76 | 0.4235 in |
| 76957 | LiAsF$_6$ | 0.542 g | 34.18 | 70 | 1167* | 1167* | 1167* | 29.74 | 181 | 40.80 | 0.4230 in |
| 76966 | LiAsF$_6$ | 0.328 g | 38.72 | 70 | 774 | 797 | 807 | 22.85 | 126 | 23.63 | 0.4210 in |
| 76967 | LiAsF$_6$ | 0.327 g | 32.46 | 70 | 771 | 795 | 805 | 26.61 | 117 | 19.56 | 0.4210 in |
| 76960 | LiClO$_4$ | 0.542 g | 51.24 | 72 | 1200* | 1200* | 1200* | 39.75 | 178 | 36.39 | 0.4235 in |
| 76961 | LiClO$_4$ | 0.542 g | 52.96 | 72 | 1200* | 1200* | 1200* | 32.24 | 179 | 35.74 | 0.4230 in |
| 76968 | LiClO$_4$ | 0.329 g | 52.96 | 70 | 768 | 788 | 799 | 35.06 | 107 | 22.69 | 0.4200 in |
| 76969 | LiClO$_4$ | 0.330 g | 52.02 | 69 | 766 | 780 | 786 | 33.80 | 121 | 23.95 | 0.4200 in |
| 76964 | LiPF$_6$ | 0.541 g | 18.22 | 68 | 1133* | 1133* | 1133* | 19.88 | 182 | 10.63 | 0.4200 in |
| 76965 | LiPF$_6$ | 0.541 g | 17.12 | 68 | 1133* | 1133* | 1133* | 18.78 | 182 | 6.44 | 0.4200 in |

TABLE 9-continued

| Cell Serial Number | Salt Type | Anode Blank Weight (g) | μ Watts After B-I & Acc. Pulse | Number of Pulse Trains | Accelerated Pulse Testing Capacity mAhrs to | | | μ Watts After Accel. Pulse | 1K Load Discharge Capacity (mAhrs) | μ Watts After 1K Load Discharge | EOL Thickness |
|---|---|---|---|---|---|---|---|---|---|---|---|
| | | | | | 2.0 V | 1.7 V | 1.5 V | | | | |
| 76970 | $LiPF_6$ | 0.324 g | 16.03 | 68 | 769 | 799 | 814 | 21.91 | 107 | 10.49 | 0.4205 in |
| 76971 | $LiPF_6$ | 0.324 g | 20.10 | 68 | 772 | 793 | 807 | 16.90 | 112 | 14.55 | 0.4205 in |

*The pulse 4 minimum voltages of these cells was above the indicated cut-offs. The indicated capacity is the amount of capacity delivered by the cells during accelerated pulse testing.
ELECTROLYTE: All salts are dissolved in 50/50 v/o PC/DME in 1M concentration.

EXAMPLE XI

Comparison Of Heat DissipatiOn Of $LiPF_6$ Versus $LiAsF_6$ And $LiClO_4$ In Li/SVO Cells After undergoing accelerated pulse testing in Example X, the energy potential of the 60% lithium cells returned to about 2.6 V. This high open circuit voltage indicated that not all the lithium was utilized during discharge. In order to determine how much of the heat dissipation was due to lithium/electrolyte reactivity, the 60% lithium cells were then discharged under a 1 KΩ load at 37° C. to approximately 0 mV, which they reached after about 65 hours on this load. The 60% lithium cells delivered between about 107 mAhs and 126 mAhs of capacity.

The standard lithium cells used in Example X were then discharged for a similar length of time, i.e., 65 hours, under a 1 KΩ load with between about 178 mAhrs to 182 mAhrs of capacity being delivered. Heat dissipation was recorded after 1 KΩ discharge.

As is evident from Table 9, statistically significant separation between standard lithium and 60% lithium cells is evident within the $LiAsF_6$ and $LiClO_4$ salt groups. The standard and 60% lithium $LiAsF_6$ cells dissipated an average of 41.28 μWatts and 21.60 μWatts of heat respectively, while the standard and 60% lithium $LiClO_4$ cells dissipated an average of 36.07 μWatts and 23.32 μWatts of heat, respectively. Statistically significant differences do not exist between lithium groups within the $LiPF_6$ electrolyte salt set as the standard and 60% lithium $LiPF_6$ cells dissipated an average of 8.54 μWatts and 12.52 μWatts of heat, respectively. Collectively, the $LiPF_6$ cells dissipated an average of about 10.53 μWatts of heat. Statistically significant differences appear to exist in the heat dissipated after 1 KΩ discharge between the standard lithium $LiAsF_6$ and $LiClO_4$ cells, the 60% lithium $LiAsF_6$ and $LiClO_4$ cells, and between the collective $LiPF_6$ cells and all other cell groups.

Also noteworthy from Table 9 is the end-of-life (EOL) thicknesses of the various cells. The standard $LiPF_6$ cells had EOL thicknesses that were less than the EOL thicknesses of the standard lithium $LiAsF_6$ and $LiClO_4$ cells but comparable to the 60% lithium $LiAsF_6$ and $LiClO_4$ cells. The standard lithium $LiAsF_6$ and $LiClO_4$ cells had an average EOL thickness of about 0.4233±0.0003 in. and the 60% lithium $LiAsF_6$ and $LiClO_4$ cells had an average EOL thickness of about 0.4205±0.0006 in. The average EOL thickness of the standard and 60% lithium $LiPF_6$ cells was about 0.4208±0.0003 in.

Figure 33:
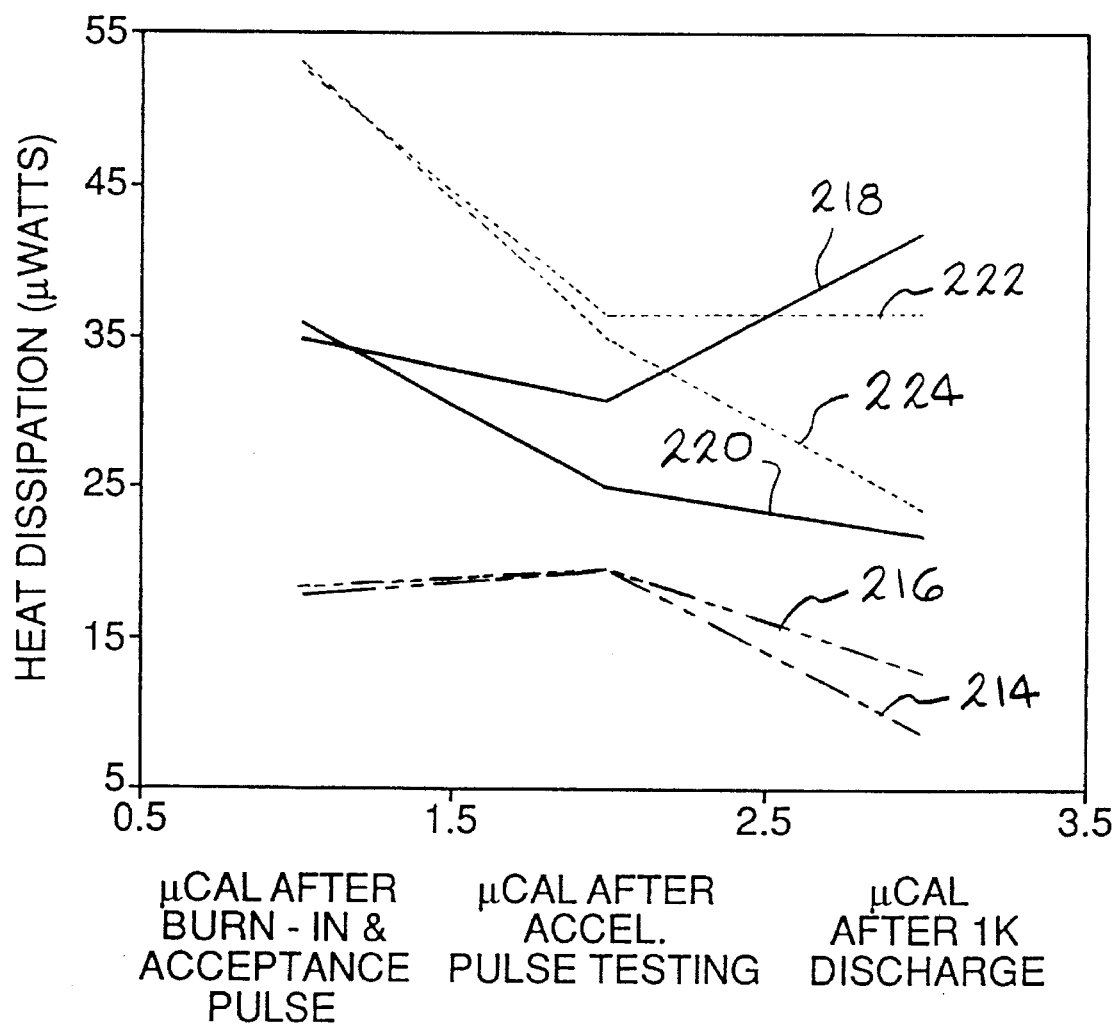
FIG. 33 is a graph showing trends in the amount of heat dissipated by various lithium/silver vanadium oxide cells activated by electrolytic solutions according to the present invention comprising lithium hexafluorophosphate salt ($LiPF_6$) in comparison to electrolyte salts comprising lithium hexafluoroarsenate ($LiAsF_6$) and lithium perchlorate ($LiClO_4$).

FIG. 33 illustrates the trends in the amount of heat dissipated by the various experimental cells used in Examples IX to XI after burn-in and acceptance pulse testing (Example IX), accelerated pulse testing (Example X) and 1 KΩ discharge testing (Example XI), as indicated in Table 9. In particular, curve 214 was recorded from the average discharge of the two lithium/silver vanadium oxide cells (Li/SVO) indicated as Ser. Nos. 76964 and 76965 and having a standard amount (0.542 grams) of active anode material and an electrolyte comprising $LiPF_6$ according to the present invention; curve 216 was recorded from the average discharge of the two Li/SVO cells indicated as Ser. Nos. 76970 and 76971 and having 60% of the standard amount (0.327 grams) of the active anode material and an electrolyte comprising $LiPF_6$; curve 218 was recorded from the average discharge of two standard Li/SVO cells indicated as Ser. Nos. 76956 and 76957 and having an electrolyte comprising $LiAsF_6$ according to the prior art; curve 220 was recorded from the average discharge of the two 60% of standard Li/SVO cells indicated as Ser. Nos. 76966 and 76967 and having the $LiAsF_6$ electrolyte; curve 222 was recorded from the average discharge of the two standard Li/SVO cells indicated as Ser. Nos. 76960 and 76961 and having an electrolyte comprising $LiClO_4$ according to the prior art; and curve 224 was recorded from the average discharge of the two 60% of standard Li/SVO cells indicated as Ser. Nos. 76968 and 76969 and having the $LiClO_4$ electrolyte.

Figure 9:
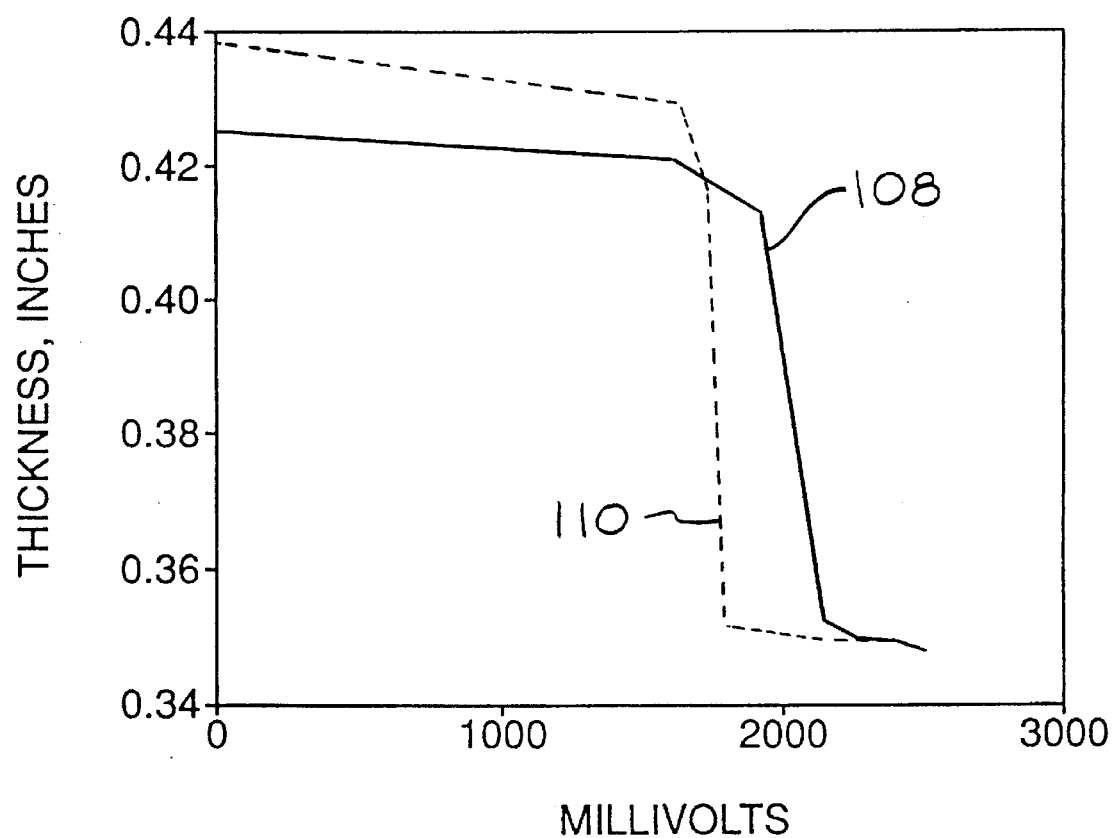
FIG. 9 is a graph showing the thickness of cells activated with either a $LiAsF_6$ or a $LiPF_6$ electrolytic solution while being discharged through a 10 KΩ resistor.

From FIG. 9 and Examples IX to XI, it is evident that the $LiClO_4$ cells dissipated the greatest amount of heat after both burn-in and accelerated pulse testing. Differences were not apparent in the heat dissipation response for the standard lithium and 60% lithium cells filled with $LiAsF_6$ or the $LiClO_4$ electrolytic solutions after burn-in and accelerated pulse testing. However, after 1 KΩ discharge testing, differences were apparent. The standard lithium cells dissipated more heat than the 60% lithium cells. This indicates that a portion of the heat dissipated by the lithium anode cells containing $LiAsF_6$ or $LiClO_4$ can be attributed to lithium/electrolyte reactivity.

The $LiPF_6$ cells dissipated less heat after each test in Examples IX to XI than the $LiAsF_6$ and $LiClO_4$ cells, regardless of the amount of lithium originally contained in the cells. Additionally, separation between the standard and 60% lithium $LiPF_6$ cells was not evident after burn-in, accelerated pulse testing or 1 KΩ discharge testing. This leads to the conclusion that $LiPF_6$/lithium reactivity appears to be minimal when compared to other processes within the cell contributing to heat dissipation. Thus, based on the heat dissipation characteristics of the cells studied, the $LiAsF_6$ and $LiClO_4$ electrolytes appear to be more reactive toward lithium than $LiPF_6$.

Thus, it is shown by the results from Examples III to XI that the use of an electrolytic solution comprising an ion-forming alkali metal salt of hexafluorophosphate dissolved in an organic solvent and coupled with an alkali metal anode greatly reduces the voltage delay of the high pulse power cell of the present invention, as well as, benefiting the heat dissipation characteristics of such a cell. This is particularly the case when the anode comprises lithium and the electrolytic solution comprises lithium hexafluorophosphate as the ion-forming salt. Further, when the electrolytic solution of the present invention is used in conjunction with an aluminum cathode current collector, there is markedly reduced evidence of reactivity between these two cell components in comparison with other conductor materials such as titanium used in an electrochemical cell activated with lithium hexafluorophosphate.

EXAMPLE XII

Comparison Of Cell Performance Of High Pulse Power Cell Versus Li/SVO Cells Activated With LiAsF$_6$ Two prior art cells and a high pulse power cell system according to the present invention were constructed in a similar manner as those described in Example I. These cells were electrically tested to further demonstrate the improvements in cell performance attributable to the preferred electrochemical system of the present invention. Both prior art cells utilized pressed, multiplate cathodes, titanium cathode current collectors and ribbon lithium anodes, and they are referred to as prior art cell type A and prior art cell type B in this example.

In comparison, the high pulse power cell according to the present invention was built having a lithium aluminum alloy anode, a nickel oxide anode current collector, a calendared silver vanadium oxide cathode sheet pressed onto an aluminum cathode current collector. The cell components were then configured in a jellyroll electrode assembly.

The prior art cells were vacuum filled with a 1M LiAsF$_6$ PC/DME(50:50) electrolytic solution, while the high pulse power cell of the present invention was vacuum filled with 1M LiPF$_6$ PC/DME (50:50) electrolytic solution. These cells were then burned-in and accelerated discharge tested. A constant current pulse was applied to the cells every thirty minutes during the accelerated discharge testing. The pulse train consisted of four 10 second pulses with 15 second rests between each pulse. The pulse amplitude was 2.00 amperes, 1.23 amperes and 2.00 amperes for the prior art cell type A, prior art cell type B, and high pulse power cell, respectively.

Figure 34:
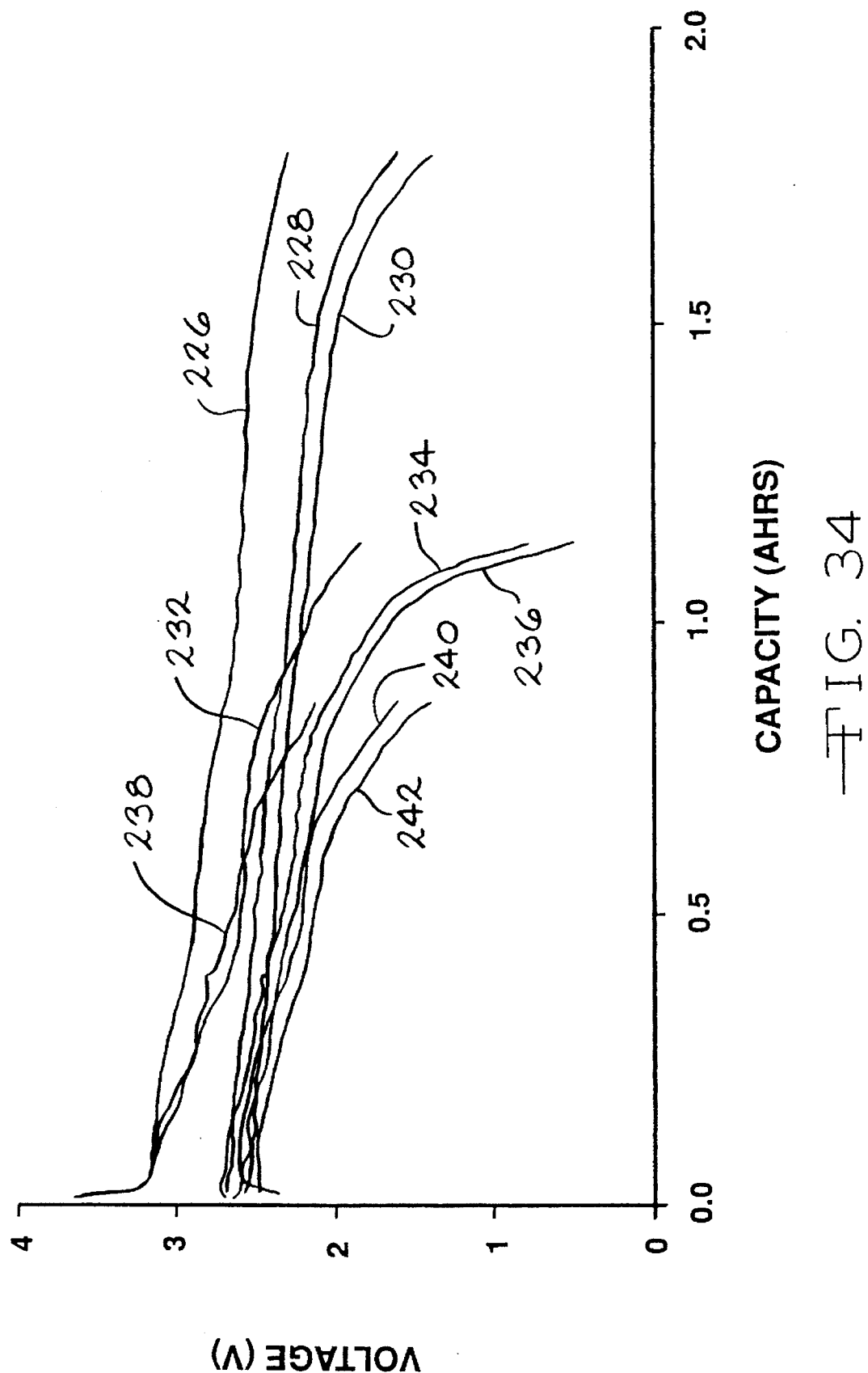
FIG. 34 is a graph showing the discharge curves of two prior art cells in comparison to the electrochemical cell of the present invention.

FIG. 34 is a graph showing typical discharge curves for each of the prior art cells and for the high pulse power cell of the present invention. In that respect, curve 226 was constructed from the prepulse open circuit voltage with no load of the prior art cell type A, curve 228 was constructed from the minima of the first pulse of each pulse train of this cell and curve 230 was constructed from the minimum of the fourth pulse of each pulse train of the prior art type A cell. Similarly, curve 232 was constructed from the prepulse open circuit voltage with no load of the prior art cell type B, curve 234 was constructed from the minima of the first pulse of each pulse train of the cell and curve 236 was constructed from the minima of the fourth pulse of each pulse train of the prior art type B cell.

In comparison, curve 238 was constructed from the prepulse open circuit voltage with no load of the high pulse power cell of the present invention, curve 240 was constructed from the minima of the first pulse of each pulse train of this cell and curve 242 was constructed from the minima of the fourth pulse of each pulse train of the present high pulse power cell.

Table 10 shows the external cell volume, electrode surface area, current amplitude, capacity delivered to 2.0 V, 1.7 V, and 1.5 V, cathode efficiency to 2.0 V, 1.7 V and 1.5 V, and the energy density at 2.0 V, 1.7 V and 1.5 V for the prior art type A and type B cells and the high pulse power cell of the present invention.

TABLE 10

| Cell Characteristic | Prior Art Type A | Prior Art Type B | High Pulse Power Cell |
|---|---|---|---|
| External Cell Volume | 10.3 cc | 6.4 cc | 5.0 cc |
| Electrode Surface Area | 86 cm$^2$ | 53 cm$^2$ | 114 cm$^2$ |
| Current Amplitude Delivered | 2000 mAmp | 1230 mAmp | 2000 mAmp |
| Capacity to . . . | | | |
| 2.0 V | 1.465 Ahrs | 0.827 Ahrs | 0.576 Ahrs |
| 1.7 V | 1.686 Ahrs | 0.975 Ahrs | 0.678 Ahrs |
| 1.5 V | 1.758 Ahrs | 1.033 Ahrs | 0.720 Ahrs |
| Cathode Efficiency to . . . | | | |
| 2.0 V | 62.9% | 72.4% | 71.9% |
| 1.7 V | 72.4% | 85.4% | 84.7% |
| 1.5 V | 75.5% | 90.5% | 89.9% |
| Energy Density | | | |
| 2.0 V | 0.34 Whrs/cc | 0.31 Whrs/cc | 0.31 Whrs/cc |
| 1.7 V | 0.39 Whrs/cc | 0.36 Whrs/cc | 0.36 Whrs/cc |
| 1.5 V | 0.40 Whrs/cc | 0.37 Whrs/cc | 0.38 Whrs/cc |

The synergistic advantages gained by the combination of materials namely, the lithium aluminum alloy anode, nickel anode current collector, silver vanadium oxide cathode active material, aluminum cathode current collector and lithium hexafluorophosphate, dissolved in a mixture of organic solvents, used to fabricate the high pulse power cell and the configuration of its electrodes, namely the jellyroll assembly, are quite evident in Table 10. The high pulse power cell is approximately 20% smaller than the prior art type B cell, has two times more electrode surface area and discharges as efficiently with current amplitudes that are 1.6 times higher than those used to discharge the prior art type B cell. Also, the high pulse power cell discharges more efficiently than the prior art type A cell with an equivalent current amplitude even though it is approximately 50% smaller. Further, the energy density of the high pulse power cell of the present invention is not compromised by the reduced volume of the cell container and, in fact, the energy density is comparable to the energy densities of both the prior art cells.

It is intended that the foregoing description and examples be only representative of the present invention and that the present invention be only limited by the hereinafter appended claims.

What is claimed is:

1. A high pulse power electrochemical cell, which comprises:

a) an anode comprising an alkali metal which is electrochemically oxidized to form metal ions in the cell upon discharge to generate electron flow in an external electrical circuit connected to the cell;

b) an anode current collector associated with the anode;

c) a cathode comprising a cathode active material selected from one of the group consisting of a metal element, metal oxide, a mixed metal oxide and a metal sulfide and a combination thereof;

d) a cathode current collector electrically associated with the cathode and comprising aluminum wherein the cathode is characterized as having at least one cathode plate prepared from a paste of the cathode active material mixed with a solvent material and calendared into a cathode sheet with the solvent material removed from the cathode sheet as a dry cathode sheet formed into free standing cathode structures having various geometric shapes, with at least one cathode structure pressed onto at least one side of the cathode current collector to form a laminated cathode and without the cathode active material. losing its ability to generate electron flow by intercalating metal ions formed by oxidation of the anode; and e) an electrolytic solution operatively associated with the anode and the cathode and comprising an inorganic salt having the general formula $MM'F_6$ dissolved in a nonaqueous solvent, wherein M is an alkali metal similar to the alkali metal comprising the anode so that reactivity between the alkali metal of the electrolyte solution and that of the anode is reduced which benefits reduced heat dissipation and improved cell efficiency and M' is an element selected from the group consisting of phosphorous, arsenic and antimony.

2. The electrochemical cell of claim 1 wherein the anode is comprised of lithium.

3. The electrochemical cell of claim 1 wherein the anode comprises either lithium or a lithium-aluminum alloy.

4. The electrochemical cell of claim 3 wherein aluminum comprises up to about 50%, by weight, of the anode alloy.

5. The electrochemical cell of claim 1 wherein the anode comprises lithium and the inorganic salt comprising the electrolytic solution is lithium hexafluorophosphate.

6. The electrochemical cell of claim 1 wherein the nonaqueous solvent comprises an organic solvent selected from the group consisting of tetrahydrofuran, propylene carbonate, methyl acetate, acetonitrile, dimethyl sulfoxide, dimethyl formamide, dimethyl acetamide, ethylene carbonate, diglyme, triglyme, tetraglyme, 1,2-dimethoxyethane and mixtures thereof.

7. The electrochemical cell of claim 1 wherein the nonaqueous solvent is an organic solvent that comprises propylene carbonate and dimethoxyethane.

8. The electrochemical cell of claim 7 wherein the propylene carbonate and dimethoxyethane are present in a ratio of about 1:1 by volume.

9. The electrochemical cell of claim 1 wherein the cathode comprises a cathode active material selected from the group consisting of silver vanadium oxide, copper silver vanadium oxide, manganese dioxide, cobalt oxide, nickel oxide, titanium disulfide and copper vanadium oxide, and mixtures thereof.

10. The electrochemical cell of claim 1 wherein the cathode active material is silver vanadium oxide formed as a preparation product of one of the group consisting of a thermal treatment reaction, addition reaction, sol-gel formation, chemical vapor deposition and hydrothermal synthesis of vanadium oxide and a silver-containing constituent.

11. The electrochemical cell of claim 1 wherein the cathode sheet is characterized as dried under a vacuum to remove any residual solvent.

12. The electrochemical cell of claim 1 wherein the cathode sheet comprises from between about 80 weight percent to about 99 weight percent of the cathode active material.

13. The electrochemical cell of claim 1 wherein the cathode further comprises binder material and conductor additives.

14. The electrochemical cell of claim 13 wherein the binder material is a fluoro-resin powder.

15. The electrochemical cell of claim 13 wherein the conductive additives are selected from the group consisting of carbon, graphite powder, acetylene black and a combination thereof.

16. The electrochemical cell of claim 1 wherein the cathode sheet comprises about 0 to 3 weight percent carbon, about 1 to 5 weight percent of a powder fluoro-resin and about 94 weight percent of silver vanadium oxide as the cathode active material.

17. The electrochemical cell of claim 1 wherein the cathode sheet has a thickness in the range of from between about 0.004 inches to about 0.020 inches.

18. A high pulse power electrochemical cell, which comprises:

a) an anode comprising lithium which is electrochemically oxidized to form lithium metal ions in the cell upon discharge to generate electron flow in an external electrical circuit connected to the cell;

b) an anode current collector associated with the anode;

c) a cathode comprising a cathode active material selected from the group consisting of a metal element, a metal oxide, a mixed metal oxide and a metal sulfide, and a combination thereof;

d) a cathode current collector electrically associated with the cathode wherein the cathode is characterized as having at least one free-standing cathode structure prepared from a paste of the cathode active material mixed with a solvent material and calendared and formed into the free-standing cathode structure with the solvent material removed and with at least one cathode structure pressed on at least one side of the cathode current collector to form a laminated cathode without the cathode active material losing its ability to intercalate metal ions formed by oxidation of the anode; and e) an electrolytic solution operatively associated with the anode and the cathode and comprising lithium hexaflurophosphate dissolved in an organic solvent.

19. The electrochemical cell of claim 18 wherein the cathode sheet comprises from about 80 weight percent to about 99 weight percent of the cathode active material.

20. The electrochemical cell of claim 18 wherein the cathode structure further comprises binder and conductor materials.

21. The electrochemical cell of claim 18 wherein the cathode structure comprises about 0 to 3 weight percent carbon, about 1 to 5 weight percent of a powder fluoro-resin and about 94 weight percent cathode active material.

22. The electrochemical cell of claim 18 wherein the cathode active material is selected from the group consisting of silver vanadium oxide, copper silver vanadium oxide, manganese dioxide, titanium disulfide, cobalt oxide and nickel oxide, and copper vanadium oxide, and mixtures thereof.

23. The electrochemical cell of claim 18 wherein the anode is comprised of lithium.

24. The electrochemical cell of claim 18 wherein the organic solvent is selected from the group consisting of tetrahydrofuran, propylene carbonate, methyl acetate, acetonitrile, dimethyl sulfoxide, dimethyl formamide, dimethyl acetamide, ethylene carbonate, diglyme, triglyme, tetraglyme, 1,2-dimethoxyethane and mixtures thereof.

25. A method for providing a high energy density electrochemical cell that upon being discharged delivers high current pulses, exhibits reduced voltage delay, rapidly recovers its open circuit voltage with reduced heat dissipation and has high current capacity, which comprises:

a) providing an anode comprising an alkali metal which is electrochemically oxidized to form metal ions in the cell upon discharge to generate electron flow in an external electrical circuit connected to the cell;

b) associating the anode with an anode current collector;

c) providing a cathode comprising a cathode active material selected from the group consisting of a metal element, a metal oxide, a mixed metal oxide and a metal sulfide, and a combination thereof, wherein the cathode active material is subjected to a process including the step of:

i) mixing the cathode active material with a solvent material to form a paste;

ii) calendaring the paste into a cathode sheet;

iii) removing the solvent material from the cathode sheet; and iv) forming the cathode sheet into free-standing cathode structures having various geometric shapes;

d) associating the cathode with a cathode current collector comprising aluminum by pressing at least one free-standing cathode structure on each side of the current collector to form a laminated cathode for use in the electrochemical cell without the cathode active material losing its ability to generate electron flow by intercalating metal ions formed by oxidation of the anode; and e) activating the electrochemical cell with a nonaqueous electrolytic solution operatively associated with the anode and the cathode, the nonaqueous electrolytic solution comprising an inorganic salt having the general formula $MM'F_6$ dissolved in a nonaqueous solvent, wherein M is an alkali metal similar to that comprising the anode so that reactivity between the alkali metal of the electrolytic solution and that of the anode is minimized which benefits heat dissipation and cell efficiency and M' is an element selected from the group consisting of phosphorous, arsenic and antimony.

26. The method of claim 25 providing the anode comprising lithium.

27. The method of claim 25 providing the anode comprising a lithium aluminum alloy.

28. The method of claim 25 wherein providing the anode current collector comprising nickel.

29. The method of claim 25 providing the cathode comprising silver vanadium oxide associated with the aluminum cathode current collector.

30. The method of claim 25 wherein the cathode sheet comprises from about 80 weight percent to about 99 weight percent of the cathode active material.

31. The method of claim 25 including providing binder and conductor materials in the paste comprising the cathode active material.

32. The method of claim 25 wherein the paste is comprised of about 3 weight percent carbon, about 1 to 5 weight of a powder fluoro-resin and about 94 weight percent of the cathode active material.

33. The method of claim 25 wherein the solvent material is selected from the group consisting of water and an inert organic material.

34. The method of claim 25 wherein calendaring the paste into the cathode sheet comprises feeding the paste through a roll mill means.

35. The method of claim 34 further including the step of first feeding the paste into a compaction means that serves to provide the cathode active material in a pellet form prior to introduction to the roll mill means.

36. The method of claim 25 wherein the cathode active material is selected from the group consisting of silver vanadium oxide, copper silver vanadium oxide, manganese dioxide, titanium disulfide, cobalt oxide, nickel oxide, and copper vanadium oxide, and mixtures thereof.

37. The method of claim 25 wherein the step of forming the paste into the cathode sheet further comprises the dropwise addition of a liquid electrolyte.

38. The method of claim 25 wherein the cathode sheet has a thickness in the range of from between about 0.004 inches to about 0.020 inches.

39. An electrochemical cell, which comprises:

a) a lithium anode;

b) a cathode current collector comprising aluminum;

c) a cathode comprising a free-standing sheet of silver vanadium oxide characterized as pressed onto the cathode current collector as a laminated cathode; and d) an electrolytic solution operatively associated with the anode and the cathode, the electrolytic solution comprising lithium hexafluorophosphate dissolved in propylene carbonate and dimethoxyethane.

40. The electrochemical cell of claim 39 further including an anode current collector comprising nickel.

41. A method for providing a high energy density electrochemical cell that upon being discharged delivers high current pulses, exhibits reduced voltage delay, rapidly recovers its open circuit voltage with reduced heat dissipation and has high current capacity, which comprises:

a) providing an anode comprising lithium which is electrochemically oxidized to form lithium metal ions in the cell upon discharge to generate electron flow in an external electrical circuit connected to the cell;

b) associating the anode with an anode current collector;

c) providing a cathode comprising a free-standing cathode structure prepared by a process which includes the steps of:

i) mixing a cathode active material selected from the group consisting of a metal element, a metal oxide, a mixed metal oxide and a metal sulfide, and combinations thereof with a solvent material to form a paste;

ii) subjecting the paste to a calendaring means forming the free-standing cathode structure; and iii) removing the solvent material from the cathode structure;

d) associating the free-standing cathode structure with a cathode current collector by pressing at least one cathode structure on each side of the current collector means to form a laminated cathode for use in the electrochemical cell without the cathode active material losing its ability to generate electron flow by intercalation of metal ions formed by oxidation of the anode; and e) activating the electrochemical cell with a nonaqueous electrolytic solution operatively associated with the anode and the cathode and comprising lithium hexafluorophosphate dissolved in an organic solvent.

42. The method of claim 41 including providing the cathode current collector comprising aluminum.

* * * * *